United States Patent
Jones

(10) Patent No.: US 10,610,712 B2
(45) Date of Patent: Apr. 7, 2020

(54) AIRCRAFT FUEL SYSTEMS

(71) Applicant: Aero Systems Consultants LLC, Naples, FL (US)

(72) Inventor: Philip E. Jones, Naples, FL (US)

(73) Assignee: AERO SYSTEMS CONSULTANTS LLC, Naples, FL (US)

( * ) Notice: Subject to any disclaimer, the term of this patent is extended or adjusted under 35 U.S.C. 154(b) by 0 days.

(21) Appl. No.: 14/526,425

(22) Filed: Oct. 28, 2014

(65) Prior Publication Data

US 2015/0217153 A1 Aug. 6, 2015

Related U.S. Application Data

(63) Continuation-in-part of application No. 14/094,639, filed on Dec. 2, 2013, now abandoned.

(51) Int. Cl.
*B64D 37/32* (2006.01)
*A62C 3/08* (2006.01)
(Continued)

(52) U.S. Cl.
CPC .............. *A62C 3/08* (2013.01); *B64D 37/02* (2013.01); *B64D 37/32* (2013.01); *B64D 37/34* (2013.01);
(Continued)

(58) Field of Classification Search
CPC ........ B64D 45/00; B64D 37/02; B64D 37/34; B64D 2013/0659; B64D 37/32;
(Continued)

(56) References Cited

U.S. PATENT DOCUMENTS 2,309,813 A 2/1943 Whiting
2,345,547 A * 3/1944 Roth ...................... B64D 37/10
137/493.6
(Continued)

OTHER PUBLICATIONS

Office Action for U.S. Appl. No. 14/094,639, dated Aug. 12, 2015, Philip E. Jones, "Aircraft Fuel Systems", 14 pages.
(Continued)

*Primary Examiner* — Medhat Badawi
*Assistant Examiner* — Vicente Rodriguez
(74) *Attorney, Agent, or Firm* — Edell, Shapiro & Finnan, LLC

(57) ABSTRACT

An aircraft fuel system architecture which reduces the fleet-wide flammability exposure of the fuel tanks. In one embodiment, the aircraft center fuel tank fuel is cooled at certain times in a flight to reduce its flammability exposure to be similar to that of an unheated conventional metal wing fuel tank. Aircraft fuel tanks that have adjacent heat sources are also insulated to minimize heat flow into the fuel. Fuel tanks that have lower cooling properties, such as composite wing tanks are cooled at certain times during flight such that their temperatures are reduced to be similar to metal wing tanks when the fuel is flammable. A fuel tank that is pressurized relative to outside pressure at altitude having a lower flammability exposure than unpressurized tanks is combined with the cooling of fuel in the tank to reduce the fleet-wide flammability exposure of the fuel tank to be similar to that of an unpressurized metal wing tank. Fuel is cooled by recirculating flow from a tank, passing through a heat exchanger and returning to the tank to be cooled. The heat exchanger is optionally cooled by flow of air from the outside of the aircraft, or by conditioned air from the aircraft environmental control system. The system is controlled by start and stop of fuel flow to the various tanks by means of a system controller. The controller uses sensors in the fuel (Continued)

tanks to command flow only when required to reduce the flammability exposure of the fuel tanks.

21 Claims, 7 Drawing Sheets

(51) Int. Cl.
   *B64D 37/34* (2006.01)
   *B64D 37/02* (2006.01)
   *B64D 45/00* (2006.01)
   *B64D 13/06* (2006.01)

(52) U.S. Cl.
   CPC ...... *B64D 45/00* (2013.01); *B64D 2013/0659* (2013.01); *B64D 2045/009* (2013.01)

(58) Field of Classification Search
   CPC ........ B64D 2700/62456; B64D 13/006; B64D 13/08; B64D 2045/009; B64D 2241/00; B64D 33/08; B64D 37/04; B64D 37/06; B64D 37/14; A62C 3/08; A62C 3/07; A62C 3/10; B65D 90/44
   USPC ...................................................... 244/135 R
   See application file for complete search history.

(56) References Cited

U.S. PATENT DOCUMENTS

| | | | |
|---|---|---|---|
| 2,860,815 A * | 11/1958 | Finn | C10G 33/06 137/14 |
| 3,158,197 A * | 11/1964 | Blezard | B64D 13/00 165/104.31 |
| 3,587,618 A * | 6/1971 | Kenyon | B64D 37/32 137/209 |
| 3,732,668 A * | 5/1973 | Nichols | B64D 37/32 220/88.3 |
| 3,946,755 A * | 3/1976 | Ulanovsky | F16K 17/19 137/493 |
| 4,354,345 A | 10/1982 | Dreisbach, Jr. et al. | |
| 4,378,920 A * | 4/1983 | Runnels | B64D 37/32 137/209 |
| 4,505,124 A | 3/1985 | Mayer | |
| 4,776,536 A | 10/1988 | Hudson et al. | |
| 6,558,823 B1 * | 5/2003 | Pinney | B64D 37/32 137/206 |
| 6,634,598 B2 * | 10/2003 | Susko | B64D 37/32 137/209 |
| 6,736,354 B2 | 5/2004 | Goto et al. | |
| 6,830,219 B1 * | 12/2004 | Picot | B01D 19/0005 244/121 |
| 7,306,644 B2 * | 12/2007 | Leigh | B01D 53/0454 244/135 R |
| 7,621,483 B2 * | 11/2009 | Cozens | B64D 37/14 137/589 |
| 8,114,198 B2 * | 2/2012 | Isella | B64D 13/06 244/135 R |
| 8,602,362 B2 | 12/2013 | Buchwald | |
| 8,777,165 B2 * | 7/2014 | Roscoe | B64D 37/08 244/135 C |
| 2009/0002948 A1 | 1/2009 | Jarlestal | |
| 2009/0313999 A1 | 12/2009 | Hunter et al. | |
| 2010/0071638 A1 | 3/2010 | Bulin | |
| 2012/0000205 A1 | 1/2012 | Coffinberry et al. | |
| 2012/0248252 A1 | 10/2012 | Al-Ali et al. | |
| 2013/0168111 A1 | 7/2013 | Wong et al. | |
| 2014/0208943 A1 | 7/2014 | Gupta | |
| 2015/0040984 A1 | 2/2015 | Ji | |
| 2015/0048210 A1 | 2/2015 | Montgomery | |
| 2015/0151845 A1 | 6/2015 | Jones | |

OTHER PUBLICATIONS

Office action for U.S. Appl. No. 14/094,639, dated Feb. 12, 2016, Jones, "Aircraft Fuel Systems", 21 pages.

FAA, "Fuel Tank Flammability Reduction Means", retrieved at <<http://www.faa.gov/documentlibrary/media/Advisory_Circular/AC-25.981-2A.pdf>>, US Dept. of Transportation, FAA, 2008, 76 pages.

German, B. J., "A Tank Heating Model for Aircraft Fuel Thermal Systems with Recirculation", American Institute of Aeronautics and Astronautics, Inc., 2011, 9 pages.

Office action for U.S. Appl. No. 14/094,639, dated Jun. 3, 2016, Jones, "Aircraft Fuel Systems", 18 pages.

* cited by examiner

Fig. 1
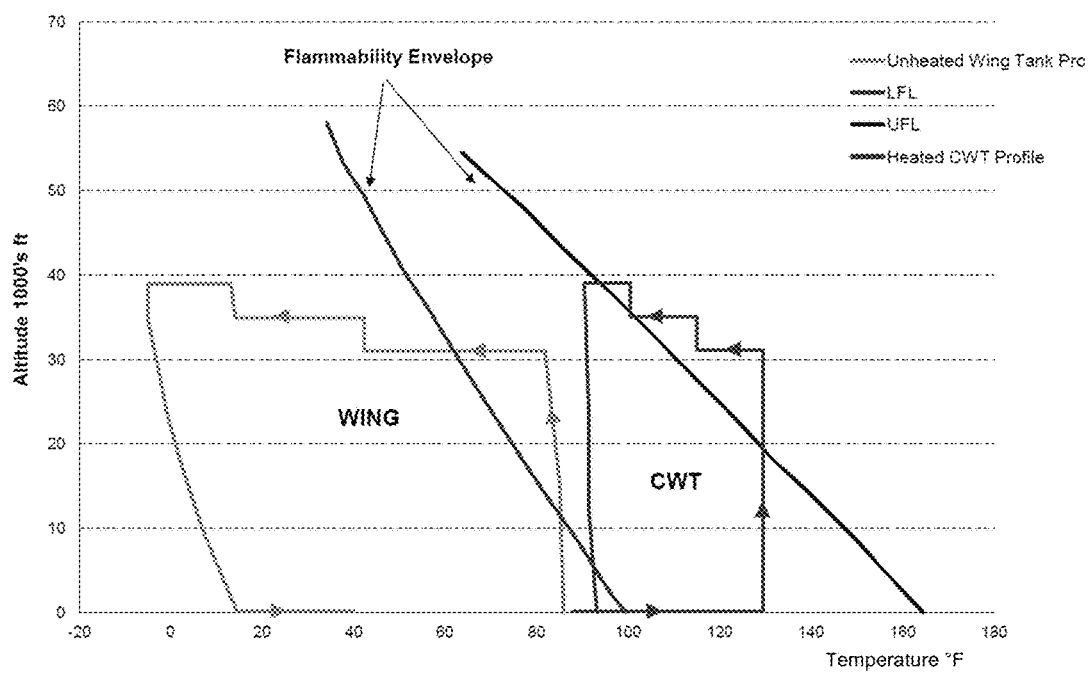
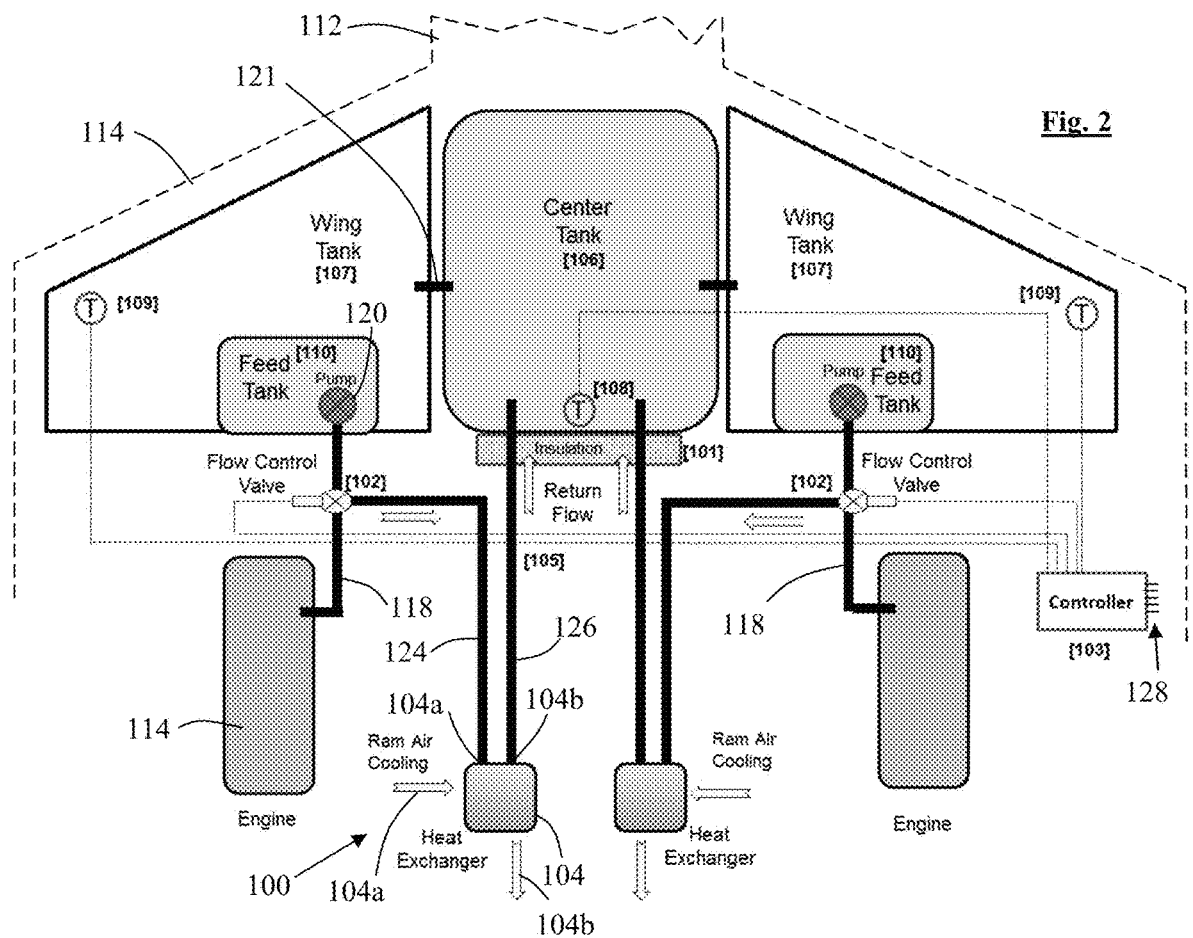
Fig. 2

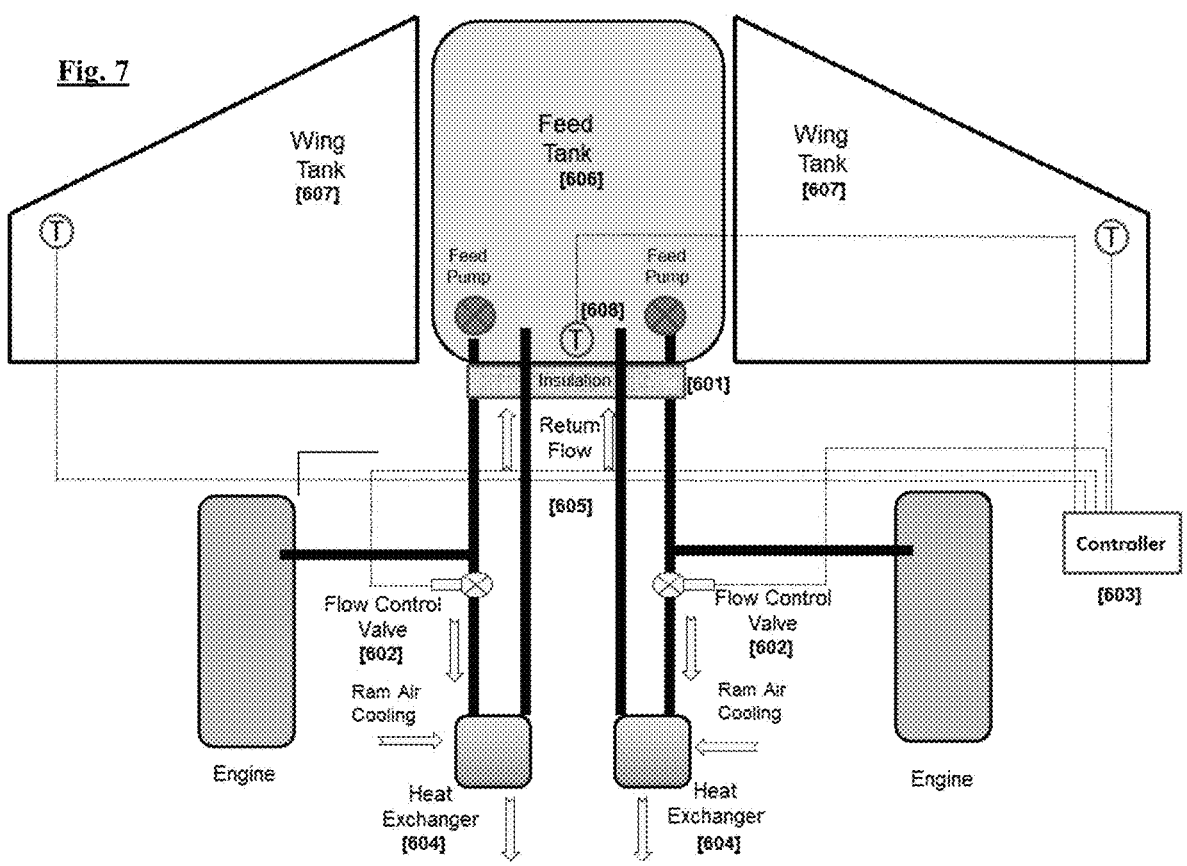
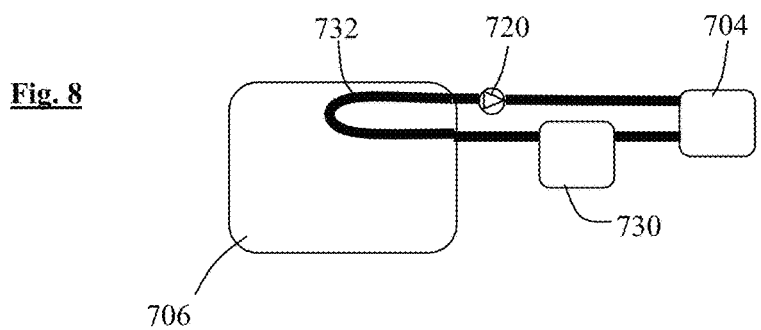
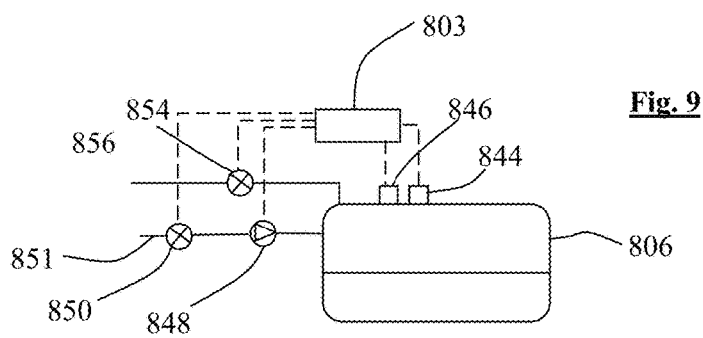

AIRCRAFT FUEL SYSTEMS

FIELD OF THE INVENTION

The present invention relates to aircraft fuel systems, and in particular to systems for improving aircraft safety and reduce aircraft vulnerability due to fuel tank flammability. It mainly has application in commercial aircraft.

BACKGROUND TO THE INVENTION

There is an increasing need for aircraft fuel tank flammability reduction solutions, primarily for commercial aircraft to comply with fuel tank flammability reduction regulations. These regulations describe requirements to make commercial aircraft fuel tank flammability exposure equivalent to unheated conventional aluminium wing tanks, on a fleet-wide average basis.

Contemporary commercial aircraft incorporate fuel tank inerting systems or in-tank oxygen reduction methods to reduce the flammability exposure of their fuel tanks on a fleet-wide average basis. This resulted from regulations developed by the FAA, EASA and other regulatory authorities around the world to reduce fuel tank-related fires and explosions. The regulations generally require that aircraft fuel tanks have a flammability exposure that is equivalent to that of a conventional [unheated] metal wing fuel tank. Commercial aircraft are being produced with fuel tank flammability reduction methods, primarily featuring replacing the air above the fuel with inert gas produced using air separation technology on-board inerting systems. Although effective, such inerting systems are often larger than desired, use on-board resources such as compressed air, and are costly to operate over their life cycle. Such systems are also difficult to monitor their effectiveness, to assure an inert atmosphere in the space above the fuel. Initial regulations focused on reducing the flammability of fuselage-mounted fuel tanks that have adjacent heat sources that may heat the fuel and cause it to be flammable for more time than is acceptable for protection against fuel tank explosions. It is expected that many future aircraft platforms will have composite wing fuel tanks which reduces cooling of the fuel in the tanks while in flight compared to conventional metal tanks, due to the fact that the composite material generally has higher insulation properties. This often results in the requirement for all of the tanks on such future aircraft platforms [including some aircraft programs currently in development] requiring inerting of all fuel tanks and not merely the fuselage mounted fuel tanks. Such 'all-tanks' inerting systems are often large, have many air separation modules (ASMs), and use a lot of compressed air which results in energy being lost to the compressed air supply. The overall cost of operation of such systems is therefore often unacceptably high.

A typical flammability exposure of a conventional metal wing tank (green line) is shown in FIG. 1. This shows that the conventional metal wing fuel tank becomes flammable during the climb portion of the flight at about 10,000 feet, by entering the 'Jet-A' fuel type, flammability envelope. The wing tank then remains in the flammability zone until the fuel in the tank cools to approximately 70 degrees F. In comparison, the heated Center Wing Tank (CWT) heats up while the aircraft is operating on the ground, pre-flight (red line). It enters the Jet-A flammability zone at about 100 degrees F., while still on the ground. The CWT then remains in the flammability zone for most of the flight, except for the time spent to the right of the Upper Flammability Limit (UFL), which constitutes a larger percentage of the flight than the exposure of the unheated wing tank profile. Although FIG. 1 shows just one of the flight profiles depicted in typical regulatory rules, it shows that during such high ambient temperature flight profiles, a CWT has a higher flammability exposure than the unheated wing tank. Fuel tanks with reduced in-flight cooling properties (such as composite skin wing tanks) may also exhibit flammability exposure that is above that for a conventional metal wing tank, and can therefore similarly require a solution to reduce their flammability exposure.

On board inerting systems overcome the problem of the CWT having a higher flammability exposure than that of an unheated wing tank by making the otherwise flammable air/vapor space above the fuel inert, and therefore not flammable. Such inerting system solutions add significant weight and cost to the aircraft platform, and may significantly add to the operational costs of the aircraft due to reduced reliability and increased maintainability. Most of the regulations allow some time when the tank is not flammable, by design or by being inoperative. Aircraft fuel tanks other than conventional unheated metallic wing tanks must reduce the flammability exposure on a fleet-wide average basis to below the levels prescribed in these regulations.

SUMMARY OF THE INVENTION

The present invention provides a flammability reduction system for an aircraft fuel tank. The system may comprise an inerting gas supply arranged to supply inerting gas to a fuel tank, a vent arranged to allow gas flow between an ullage region of the fuel tank and atmosphere, and a pressure control system arranged to close the vent to prevent the pressure in the ullage region falling below a set pressure level.

The pressure control system may be arranged to allow atmospheric air from the vent into the ullage region when the atmospheric air is above the set pressure level. The set pressure level may be set to limit the excursion pressure of the fuel tank between the aircraft taking off and landing. The set pressure may be an absolute pressure or ambient pressure. The set pressure may be equivalent to an absolute pressure in the range 14.7 to 5 psia, or in the range 12 to 8 psia. The set pressure may be approximately equivalent to 10 psia.

The pressure control system may be arranged to prevent the pressure in the ullage region exceeding the set pressure level. The pressure control system may comprise at least one valve, the valve may be arranged to control the flow of gas through the vent. The pressure control system may also include a controller arranged to control operation of the valve. The valve may be located in a duct which connects the ullage region to the vent and may control the flow of gas there between. The controller may be arranged to receive altitude data relating to a flight path, and to set the set pressure level according to the altitude data. The altitude data may comprise the maximum altitude the aircraft will reach. The pressure control system may comprise an inert gas flow control valve, an engine bleed air control valve, and a cooling circuit flow control valve, and the controller may be arranged to control any one or more of said valves.

The vent may be arranged to be connected to a further fuel tank of the aircraft whereby the pressure control system may also be arranged to control the pressure in the further tank. The further tank may be connected to a cooling circuit arranged to cool fuel in the further tank. The system may comprise a plurality of fuel tanks, the plurality of fuel tanks may include two wing tanks and a central tank or any combination of tank architectures. Alternatively the flammability reduction system may apply to the central fuel tank. The vent may be arranged to allow gas flow between ullage regions in each of the plurality of fuel tanks and the atmosphere. The inerting gas may only be supplied to the central fuel tank.

The present invention further provides a flammability reduction system for an aircraft comprising a vent arranged to allow gas flow between an ullage region of a fuel tank and atmosphere, and a pressure control system arranged to close the vent to prevent the pressure in the ullage region falling below a set pressure level.

The pressure control system may comprise at least one valve. The valve may be arranged to control the gas flow through the vent. The pressure control system may comprise a controller arranged to control operation of the valve. The pressure control system may be arranged to allow atmospheric air from the vent into the ullage region above the set pressure level. The set pressure level may be an absolute pressure or ambient pressure. The set pressure may be equivalent to an absolute pressure in the range 14.7 to 5 psia, or 12 to 8 psia. The set pressure may be approximately equivalent to 10 psia. The system may further comprise a cooling circuit arranged to cool the fuel in the fuel tank. The system may further comprise a supply of inert gas to the fuel tank. The fuel tank may be an aircraft wing tank and/or center tank or any combination of any fuel tank. The controller may be arranged to control any one or more of: a flow control valve in the cooling circuit; or a flow control valve for the inert gas supply.

The present invention further provides a fuel system for an aircraft comprising: a fuel storage system comprising a fuel tank; a fuel cooling device, which may comprise a heat exchanger; and a fuel cooling circuit arranged to carry fuel from the storage system through the cooling device and back to the storage system. The system may further comprise a pump arranged to pump fuel though the cooling circuit, and a flow control valve arranged in the cooling circuit. The system may further comprise insulation arranged to insulate the fuel tank to limit heat flow into the fuel tank.

The system may further comprise an engine fuel feed duct arranged to carry fuel from the storage system for feeding to an engine of the aircraft; and a control valve arranged in the fuel feed duct and dividing the fuel feed duct into an upstream part and a downstream part; and arranged to divert fuel from the engine feed duct towards the heat exchanger whereby the upstream part of the fuel feed duct forms a part of the cooling circuit.

The tank may comprise a center fuel tank arranged to be mounted within an aircraft fuselage plan-form of the aircraft, or a wing tank.

The heat exchanger may have an inlet arranged to receive ambient air from outside the aircraft to cool the fuel, and an outlet arranged to return the air to the atmosphere after it has passed through the heat exchanger.

The system may further comprise a controller arranged to control the flow of fuel through the cooling circuit. It may further comprise a valve. The controller may be arranged to control operation of the valve so as to control the flow of fuel through the cooling circuit.

The system may further comprise at least one temperature sensor. The temperature sensor may be arranged to sense the temperature of fuel, for example in the fuel storage system. The fuel sensor may be arranged to output sensor signals indicative of said temperature. The controller may be connected to the temperature sensor. The controller may be arranged to control the flow of fuel in response to the sensor signals.

The controller may be arranged to define a target temperature range for the fuel; may be arranged to determine a measured temperature from the sensor signals and may be arranged to stop the flow of fuel through the cooling circuit when the measured temperature is below the target range.

The controller may be arranged to determine at least one operating condition of the aircraft and to define the target temperature range on the basis of said operating condition.

The fuel tank may comprise a wing tank, or it may comprise a fuel feed tank located within the plan-form of the fuselage.

The aircraft may have an air cycle machine which has an inlet, and the heat exchanger may be arranged to receive air from said inlet.

The aircraft may have an environmental control system which has an outlet. The heat exchanger may be arranged to receive air from said environmental control system, for example from its outlet.

The tank may be a centre tank located in the fuselage of the aircraft. The storage system may further comprise a wing tank located within the wing of the aircraft. The cooling circuit may be arranged to carry fuel from the wing tank and to centre tank via the heat exchanger.

The present invention further provides a system for controlling aircraft fuel tank flammability comprising a fuel cooling system according to the invention and a fuel pre-cooling system arranged to pre-cool fuel for storage in the tank, for example at an airport gate.

The system may further comprise a source of pressurized gas, for example pressurized air, connectable to the fuel tank and arranged to be connected to the fuel tank to control the ullage pressure of the tank, for example to be higher than the ambient pressure around the aircraft, for example while the aircraft is at altitude.

The present invention further provides a fuel system for an aircraft comprising: a fuel storage system comprising a fuel tank arranged to store fuel; and a fuel cooling circuit comprising a cooling medium, a heat exchanger arranged to cool the cooling medium, and a pump arranged to pump the cooling medium through the cooling circuit thereby to cool the fuel.

The system may comprise an architecture which cools fuel and recirculate the cooled fuel to one or more tanks that have a higher flammability exposure on a fleet-wide average basis. Insulation of some fuselage-mounted tanks may also be provided to reduce the fuel cooling requirement. The normal requirement to reduce the size and time that such a system recirculates fuel may be met at least in part by optimization of system operation by means of a controller. Such solutions are potentially smaller, lighter and have lower operating costs than conventional fuel tank inerting systems, and therefore may offer a more desirable alternative.

The present invention further provides a method of reducing the flammability exposure of aircraft fuel tanks, for example to a level compliant with levels defined in the regulatory requirements for commercial aircraft. This method may include cooling of fuel in a tank, for example one which is located in the fuselage of the aircraft (such that it is subjected to reduced airflow cooling compared to a wing tank), at certain times in a flight to reduce its flammability exposure such that it is similar to that of an unheated conventional metal wing fuel tank. Further, it may include limiting the heating of such a fuselage-mounted fuel tank from adjacent heat sources such as an adjacent environmental control system, for example by means of insulation or other heat barrier. Cooling of the fuel may be accomplished by recirculating a flow of fuel through a cooling device such as a heat exchanger and returning it to the fuselage-mounted fuel tank. The heat exchanger may be cooled by cold air external to, or fed from an inlet external to, the aircraft. The flow of fuel may be accomplished by means of a dedicated flow loop, for example with a dedicated small recirculation pump, flow control valve and heat exchanger. Alternatively, fuel flow may be tapped from the fuel supply from a fuel pump that has other functions in the fuel system, such as a feed or transfer pump supply.

Alternatively, cooling of the fuselage mounted fuel tanks can be accomplished by cooled fuel or cooled air reducing the temperature of the interface barrier with the higher temperature adjacent tank by means of ducted passages.

The present invention further provides a method for reducing the flammability exposure of aircraft wing fuel tanks which exhibit reduced in-flight cooling capabilities (such as composite structures), for example to a level compliant with levels defined in the regulatory requirements for commercial aircraft. Such wing tanks are normally cooled during flight when manufactured from conventional metal due to the heat flow through the metal. In comparison, wing fuel tanks which are manufactured using composite wing skins can suffer from reduced flow of heat through the material to the surrounding airflow over the wing, due to the higher insulation properties of composites compared to conventional metal material. Cooling of the fuel may be accomplished by recirculating a flow of fuel through a cooling device such as a heat exchanger and returning it to the fuselage-mounted fuel tank. The flow of fuel may be accomplished by means of a dedicated flow loop with a dedicated small recirculation pump, flow control valve and heat exchanger. Alternatively, fuel flow may be tapped from the fuel supply from a fuel pump that has other functions in the fuel system, such as a feed or transfer pump supply. The addition of other fuel flow architectures, such as with Center of Gravity control or fuel tank water removal systems may be combined with the fuel cooling loop in order to minimize overall system complexity. The sizing of the heat capacity for these embodiments can be based on the difference in the effective heat flux difference between the composite material and the metallic wing skins on the lower wing surface.

Any of the fuel cooling fuel flow loops of the invention may incorporate heat exchangers which are cooled only during flight by means of ram-air flow and dedicated discharge of the airflow to the atmosphere, or by means of a dedicated NACA scoop to establish a positive supply pressure of cool airflow. Such dedicated cool air supply can be augmented by cooling flow during ground operation when no ram cooling is available by means of a ground cooling fan or air ejector. Alternatively, the cooling air supply can be achieved by tapping the cooling flow from the aircraft Environmental Control System (ECS) air inlet, which is normally pressurized when on the ground by a shaft driven cooling fan, or having a dedicated air outlet for the heat exchanger in the system. The same effect can be accomplished by positioning the heat exchanger immediately upstream of the ECS heat exchanger, such that cooling flow cools the subject system heat exchanger and then the ECS heat exchanger in a series configuration.

As most regulatory requirements limiting fuel tank flammability exposure focus on the relatively small percentage improvements, the fuel cooling system may only need to operate when additional flammability exposure would cause the non-compliance. For fuselage tanks that are insulated from some effects of adjacent bay heating, together with the fact that aircraft only operate in high temperature conditions some of the time, the amount of time that the cooling system must operate can in some cases be relatively short. Many flights may require that the system does not operate at all. As such, the operation of the cooling loop system may be controlled by a system controller and its associated in-tank fuel temperature sensors.

As with fuselage tanks, with wing fuel tanks which have increased insulating properties (such as composite skinned wings), the cooling loop system may be only required to operate for a small percentage of time. The system controller for these embodiments may be arranged to measure wing fuel tank temperatures to determine when to allow recirculated flow to pass through the cooling loop.

As some fuselage tanks sometimes are not refueled during operations, and the aircraft is effectively dispatched with the fuselage fuel tank empty, the systems and methods of the present invention may require that such fuselage tanks are initially partially filled, while a reduced amount of fuel is directed to the wing fuel tanks during refueling operations. This fuselage tank fuel can be transferred to the wing or collector tanks during normal operations as with most fuel transfer sequencing of typical commercial aircraft. Similarly, wing tanks which have reduced cooling capabilities (such as composite skinned wing tanks) may also have to be at least partially refueled, albeit that this is less prevalent than with fuselage tanks and depends on the flight conditions.

Typical regulatory requirements that govern the fuel flammability exposure for commercial aircraft rely on a 'Monte Carlo' method which determines the flammability of fuel tanks for an aircraft type on a fleet-wide basis. Embodiments of the present invention can reduce the fleet-wide flammability exposure by insulation and fuel cooling such that the fuel tanks are only flammable for the percentage of the time prescribed by the regulations, rather than completely eliminating flammability exposure. Otherwise the cooling loop recirculation system will be effectively shut-down.

For some aircraft applications, hot day operations may result in excessive fuel tank temperatures (in the flammability zone), even if ground fuel loop cooling is provided by ambient air cooling. In that event, the present invention may require that the fuel recirculation heat exchanger is cooled by cold ECS air when on the ground. Although this may require additional ECS capacity on the aircraft, the time when such ground cold-air additional cooling is required may be relatively small and short. Some embodiments of the present invention provide this in the event that it is required.

An option for fuel cooling of the fuel recirculation system is to incorporate a surface cooler in place of the ram-air heat exchanger.

Aircraft fuel systems which incorporate a fuselage tank as a 'feed tank' which is normally maintained full, and supplies fuel directly to the aircraft engines, may also benefit from the addition of principles of the present invention. Such aircraft fuel system architectures may require a significantly reduced heat load (and therefore system cooling capacity) of the cooling loop as they will be less susceptible to heat addition by means of their increased thermal mass, and may have reduced or zero heat input from adjacent aircraft bays. Such system applications should be modified in their size and capacity to consider the reduced heat load, and may require minimal additional recirculated fuel cooling due to the fact that cooled fuel is recirculated to them through normal fuel sequencing. The present invention can in some embodiments augment the advantages of a fuselage feed tank architecture (such as maintaining them full thereby maximizing thermal mass) by reducing or removing heat sources in or adjacent to such tanks, and augmenting cooling flow from transfer tanks by recirculated cooled fuel as required.

The fuel cooling solutions of the present invention may also be further optimized by pre-cooling of uploaded fuel during refueling. This may serve to decrease the cooling load and therefore the size of the fuel cooling system.

The fuel cooling solutions for center/fuselage tanks according to the present invention may also be further optimized when in combination with wing tanks with reduced cooling properties, by pressurizing the wing tanks to be higher than local ambient pressure, for example while at elevated altitudes. Such solutions may allow the cooling loop system size to be reduced such that the wing tanks require little or no cooling. Pressurization of the center tank at levels higher than local ambient while at elevated altitudes may similarly reduce the size and capacity of the cooling loop system.

The fuel tank floor of the 'target' tank, i.e. the tank to which cooled fuel is directed, or indeed any part of the target tank, may be cooled using a fluid other than fuel in the cooling loop. Tank cooling may be provided, for example and without limitation, by direct cold air venting, refrigerant, water/coolant mixture or hydraulic fluid. Such alternate cooling options may reduce the complexity of the cooling loop system for some aircraft types.

The system and method may include any combination of the features or limitations of the specific embodiments described herein.

The present invention may be carried into practice in various ways, but embodiments will now be described by way of example only with reference to the accompanying drawings in which:

FIG. 1 is a graph showing typical flammability exposure of a conventional metal wing tank;

FIG. 2 is a schematic diagram showing a system for controlling aircraft fuel tank flammability using a fuel distribution architecture and fuel cooling approach, according to a first embodiment of the invention;

FIG. 7 is a schematic diagram showing a system for controlling aircraft fuel tank flammability using a fuel distribution architecture and fuel cooling approach, configured for reducing fuel tank flammability exposure of a fuselage mounted fuel feed tank, according to a sixth embodiment of the invention;

FIG. 8 is a schematic diagram showing a system for controlling aircraft fuel tank flammability using a fuel distribution architecture and fuel cooling approach, configured for reducing fuel tank flammability exposure of a fuselage mounted fuel tank, according to a further embodiment of the invention;

FIG. 9 is a diagram showing a fuel tank pressure control and ullage pressurization system which may be combined with a fuel cooling loop, and form part of further embodiments of the invention;

Figure 14:
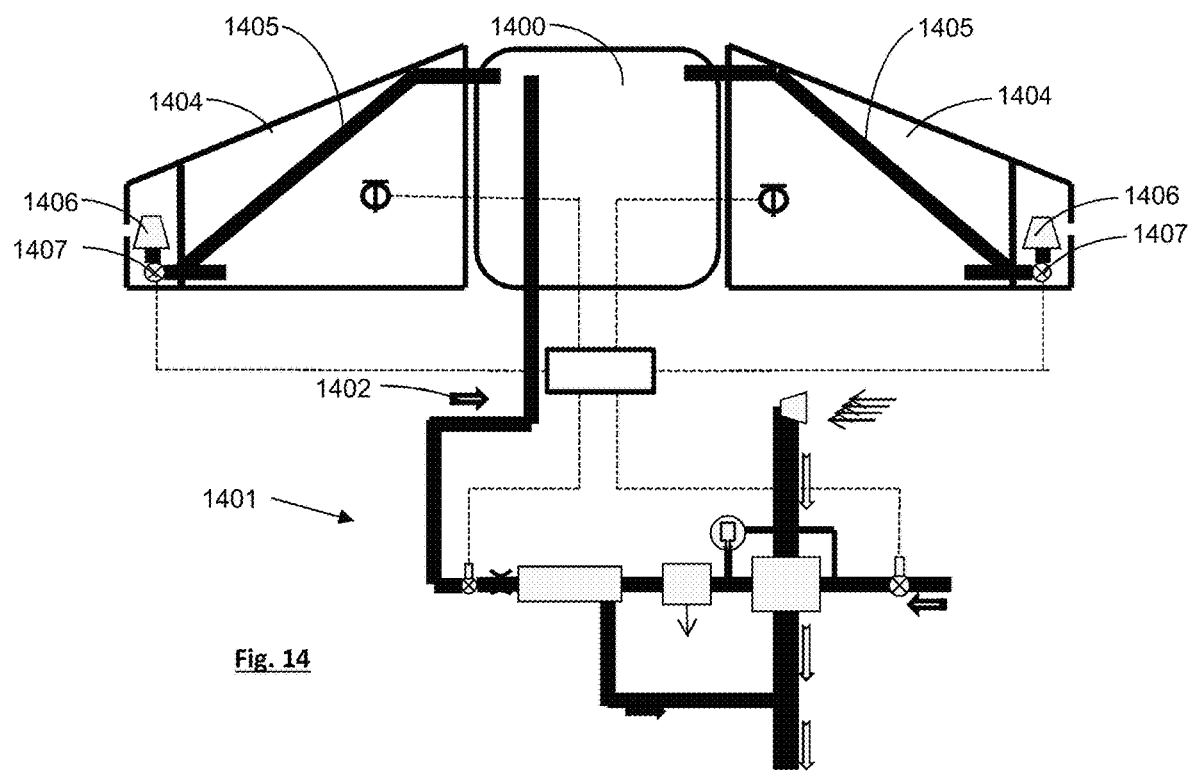
Figure 15:
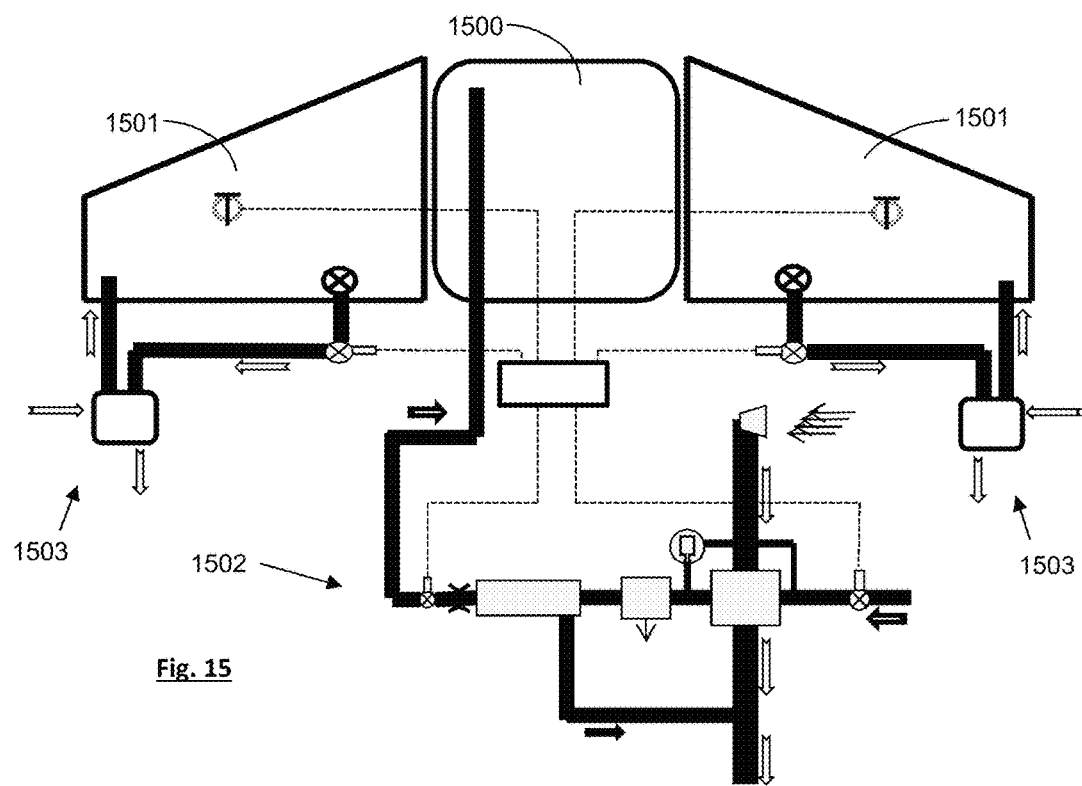

FIG. 14 is a schematic diagram showing a hybrid pressurisation and inerting system for controlling the flammability of both the central and wing fuel tanks of an aircraft, according to a further embodiment of the invention; and FIG. 15 is a schematic diagram showing a hybrid fuel tank cooling system which combines a wing tank fuel cooling system with a central tank inerting system, according to a further embodiment of the invention.

DETAILED DESCRIPTION OF PREFERRED EMBODIMENTS OF THE INVENTION

The following description is of methods, systems and processes for the development of aircraft fuel tank flammability reduction systems. Details of a method for controlling aircraft fuel tank flammability using a fuel distribution architecture and fuel cooling approach to the development of such systems are set forth.

Details of background information and current 'state-of-the-art' systems and methodologies are not included, and are assumed to be readily available to someone practiced in the technical aspects of such types of system development. Reference numbers, details and features included in the various text elements and figures are intended to be illustrative of various embodiments of the invention. As such, other embodiments can have different elements in this respect, without departing from the intent or scope of the present invention. Similarly, embodiments of the invention may be practiced without some of the details described herein.

Referring to FIG. 2 according to a first embodiment of the invention, fuel in an aircraft fuel system comprises a centre tank 106 located in the centre of the fuselage 112 of the aircraft and two wing tanks 107 each located in one of the wings 114 of the aircraft. A fuel feed tank 110 is located in each of the wing tanks 107, and each of two engines 116 is connected to a respective one of the fuel feed tanks 110 by a respective fuel feed pipe 118, and a pump 120 is provided in each of the fuel feed pipes 118 to pump fuel from the fuel feed tanks to the engines 116. Pipes 121 are provided interconnecting the tanks 106, 107, 110 of the fuel storage system in conventional manner to allow fuel to flow between them, using a conventional fuel transfer system not shown in the illustration.

A fuel cooling circuit 100 is provided on each side of the aircraft to cool the fuel in the storage system, in this case in the centre tank 106. Each cooling circuit comprises a heat exchanger 104 having an inlet 104a connected by means of a pipe 124 via a flow control valve 102 to a T-piece in the fuel feed pipe 118 and an outlet 104b connected by means of a further pipe 126 to the centre tank 106. A controller 103 is connected to both of the control valves 102 and arranged to control their operation to control the flow of fuel through the cooling circuits 100. Temperature sensors 108, 109 are provided in the centre tank 106 and wing tanks 107 to sense the temperature of fuel in those tanks, and connected to inputs of the controller 103. The controller 103 has other inputs 128 arranged to receive signals indicative of various other operational conditions of the aircraft, and to control the operation of the fuel cooling circuits in response to all of the inputs it receives as will be described in more detail below.

The fuel cooling circuit is controlled so that the fuel in the fuel storage system, in this case in the centre tank 106, is cooled to reduce its temperature below the flammability limit for the fuel being used. Heat flow from high temperature bays which are adjacent to the fuel tank 106 is minimized by use of insulation 101, in order to minimize the fuel cooling requirements of the present invention. Fuel flow is diverted from a tee in the fuel engine feed flow supply via a flow control valve 102, which allows the diverted fuel flow to be on or off. Control of the diverter valve is by means of a system controller 103. When valve 102 is open, fuel flows to both the engine and the cooling loop of the present invention. When valve 102 is closed, fuel continues to flow to the engine, whereas flow to the cooling loop is stopped. When fuel is flowing through the cooling loop, it is routed to the air cooled heat exchanger 104. Cooling air flow for the 104 heat exchanger is provided by means of a ram inlet duct or NACA scoop 104c, and discharged to the outside of the aircraft by means of an outlet duct 104d. As the fuel flows through the heat exchanger 104, its temperature is reduced and flows to the 'target tank' 106, by means of the return flow path 105 to reduce the temperature of the fuel in this tank. In the present first embodiment, the 'target tank' is the center tank located in the aircraft fuselage. Fuel is later returned to the main/wing tanks 107 by means of the standard aircraft transfer system as in normal transfer sequencing. When the temperature of the fuel in the target/center tank reduces below or equal to the required and prescribed temperature, as measured by the in-tank temperature sensor 108, the controller 103 commands the flow control valve 102 closed. The temperature of the main/wing tanks is also measured by means of the in-tank temperature sensors 109, and this temperature measurement information is conveyed to the controller 103 for temperature comparison purposes. It will be appreciated by one who is skilled in the art that the 103 controller can be programmed in different ways to control the cooling flow such that it reduces the temperature in the target tank to a level below the flammability zone for the fuel used at the required aircraft altitude within the required period of time. The dwell time of the fuel temperature is such that it is within the flammability zone and is limited to be compliant with the allowable levels in the regulations. As the regulations may prescribe that the target/center tank 106 flammability exposure is equivalent to that of the main/wing tanks 107, the system controller may analyze and compare these two tank temperatures to minimize the time for which the cooling loop is open. For example, the controller may be arranged to monitor the temperature in the wing tanks to identify times when the wing tanks are in the flammability zone, and monitor the temperature in the centre tank to identify times when the centre tank is in the flammability zone. It may then compare the amount of time for which each of the tanks has been in the flammability zone, and increase cooling of the centre tank by turning on the cooling circuit if the time for which the centre tank has been in the flammability zone exceeds a limiting value. This limiting value may be defined in relation to the time for which the wing tanks have been in the flammability zone. Alternatively it may be determined based on other operating conditions of the aircraft such as any one or more of: its altitude; the external temperature as detected by a temperature sensor arranged to detect the temperature external to the aircraft; the time for which the aircraft has been in flight; the ullage pressure in at least one of the tanks; and the level of fuel in at least one of the tanks. Alternatively the controller may be arranged to determine times when the wing tanks are not in the flammability zone, and during such times to control the temperature of the fuel in the centre tank by operation of the cooling circuit, for example so that it is also not within the flammability zone during those times.

The level of insulation 101 efficiency should also be optimized to reduce heat flow into the target tank 106, while minimizing its thickness and bay intrusion. It will be appreciated that this embodiment of the present invention is also designed to utilize the wing tank 107, feed tank 110 and center tank 106 fuel system architecture that is required for normal aircraft operation, whereas the cooling loop is the only addition to the conventional fuel system.

Figure 3:
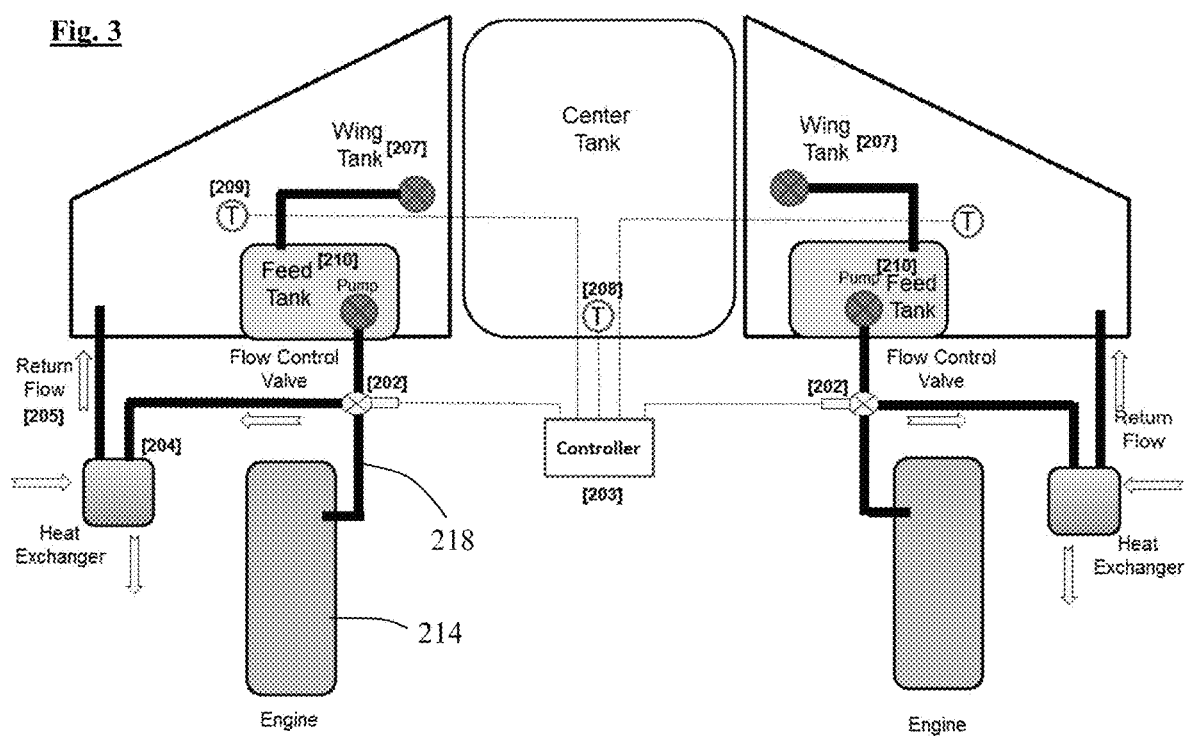
FIG. 3 is a schematic diagram showing a system for controlling aircraft fuel tank flammability using a fuel distribution architecture and fuel cooling approach, configured for reducing wing tank flammability exposure of wing tanks with reduced cooling capacity, such as composite skinned wing tanks, according to a second embodiment of the invention.

Referring to FIG. 3, a fuel system according to a second embodiment of the invention comprises a fuel cooling loop which is designed to reduce the temperature of wing tanks 207 that have reduced natural cooling properties such as, but not limited to, composite wing skin fuel tanks. Features corresponding to those in the first embodiment are indicated by the same reference numerals increased by 100. As in the first embodiment, fuel flow is tapped from the engine fuel feed line 218 by means of a flow control valve 202. Also, as in the first embodiment, a control valve 202 is utilized, and functions in the same way as the first embodiment description. Fuel flow is diverted from a tee in the fuel engine feed flow supply 218 via the flow control valve 202, which allows the diverted fuel flow to be on or off. Control of the diverter valve 202 is by means of a system controller 203. When the valve 202 is open, fuel flows to both the engine 214 and the cooling loop. When the valve 202 is closed, fuel continues to flow to the engine 214, whereas flow to the cooling loop is stopped. When the cooling loop is flowing fuel, it is routed to the air cooled heat exchanger 204. Cooling air flow for the 204 heat exchanger is provided by means of a ram inlet duct or NACA scoop, and discharged to the outside of the aircraft by means of an outlet duct. As the fuel flows through the heat exchanger, its temperature is reduced and flows to the 'target tank' 207, by means of the return flow path 205 to reduce the temperature of the fuel in this tank. In this embodiment, the 'target tank' is the wing tank 207 which is comprised of materials of reduced cooling properties, such as but not limited to composite tank walls. Fuel is later returned to the feed tanks 210 by means of the standard aircraft transfer system as in normal transfer sequencing. When the temperature of the fuel in the target/wing tank 207 reduces below or equal to the required and prescribed temperature, as measured by the in-tank temperature sensor 208, the controller 203 commands the flow control valve 202 closed. The temperature of the main/wing tanks 207 is also measured by means of the in-tank temperature sensors 209, and this temperature measurement information is conveyed to the controller 203 for temperature analysis purposes. It will be appreciated by one who is skilled in the art that the controller 203 is programmed to control the cooling flow to such that it reduces the temperature in the target tank to a level below the flammability zone for the fuel used at the required aircraft altitude within the required period of time. The dwell time of system operation is such that the fuel temperature is within the flammability zone for one or more periods of time which are limited to be compliant with the allowable levels in the regulations. This and other embodiments of the present invention are also designed to utilize the wing tank 207 and feed tank 210 fuel system architecture that is required for normal aircraft operation, whereas the cooling loop is the only addition to the conventional fuel system.

Figure 4:
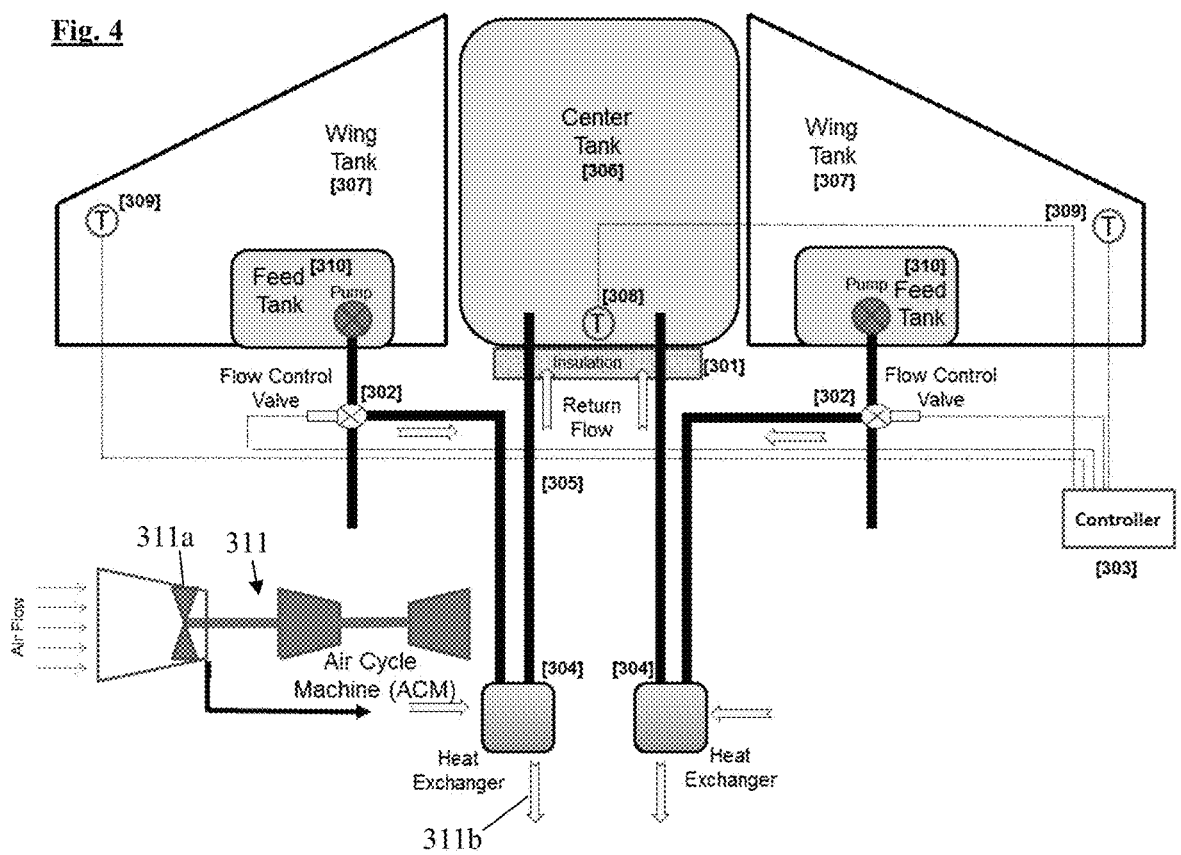
FIG. 4 is a schematic diagram showing a system for controlling aircraft fuel tank flammability using a fuel distribution architecture and fuel cooling approach, configured with cooling flow supplied from the aircraft ECS/Air Cycle Machine pressurized inlet, according to a third embodiment of the invention.

Referring to FIG. 4, a fuel system according to a third embodiment of the present invention comprises an embodiment of the invention where fuel in an aircraft fuel tank is cooled to reduce its temperature below the flammability limit for the fuel being used, using cooling air flow from the aircraft air cycle machine inlet. Again, features of FIG. 4 corresponding to those of FIG. 2 are indicated by the same reference numerals increased by 200. Heat flow from high temperature bays which are adjacent to the fuel tank is minimized by use of insulation 301, in order to minimize the fuel cooling requirements of the present invention. Fuel flow is diverted from a tee in the fuel engine feed flow supply via a flow control valve 302, which allows the diverted fuel flow to be on or off. Control of the diverter valve is by means of a system controller 303. When valve 302 is commanded open, fuel flows to both the engine and the cooling loop of the present invention. When valve 302 is commanded closed, fuel continues to flow to the engine, whereas flow to the cooling loop is stopped. When the cooling loop is flowing fuel, it is routed to the air cooled heat exchanger 304. Cooling air flow for the heat exchanger 304 is provided by means of an inlet connected to the air cycle machine 311, and specifically downstream of the aircraft air cycle machine inlet fan 311a, and discharged to the outside of the aircraft by means of an outlet duct 311b. As the fuel flows through the heat exchanger, its temperature is reduced and flows to the 'target tank' 306, by means of the return flow path 305 to reduce the temperature of the fuel in this tank. In the present embodiment, the 'target tank' is the center tank located in the aircraft fuselage. Fuel is later returned to the main/wing tanks 307 by means of the standard aircraft transfer system as in normal transfer sequencing. When the temperature of the fuel in the target/center tank reduces below or equal to the required and prescribed temperature, as measured by the in-tank temperature sensor 308, the controller 303 commands the flow control valve 302 closed. The temperature of the main/wing tanks is also measured by means of the in-tank temperature sensors 309, and this temperature measurement information is conveyed to the controller 303 for temperature comparison purposes. It will be appreciated by one who is skilled in the art that the 303 controller is programmed to control the cooling flow to such that it reduces the temperature in the target tank to a level below the flammability zone for the fuel used at the required aircraft altitude within the required period of time. The dwell time of system operation is such that the fuel temperature is within the flammability zone for one or more periods of time which are limited to be compliant with the allowable levels in the regulations. As the regulations may prescribe that the target/center tank 306 flammability exposure is equivalent to that of the main/wing tanks 307, the system controller may analyze and compare these two tank temperatures to minimize the time whereas the cooling loop is commanded open. The level of insulation 301 efficiency should also be optimized to reduce heat flow into the target tank 306, while minimizing its thickness and bay intrusion.

Figure 5:
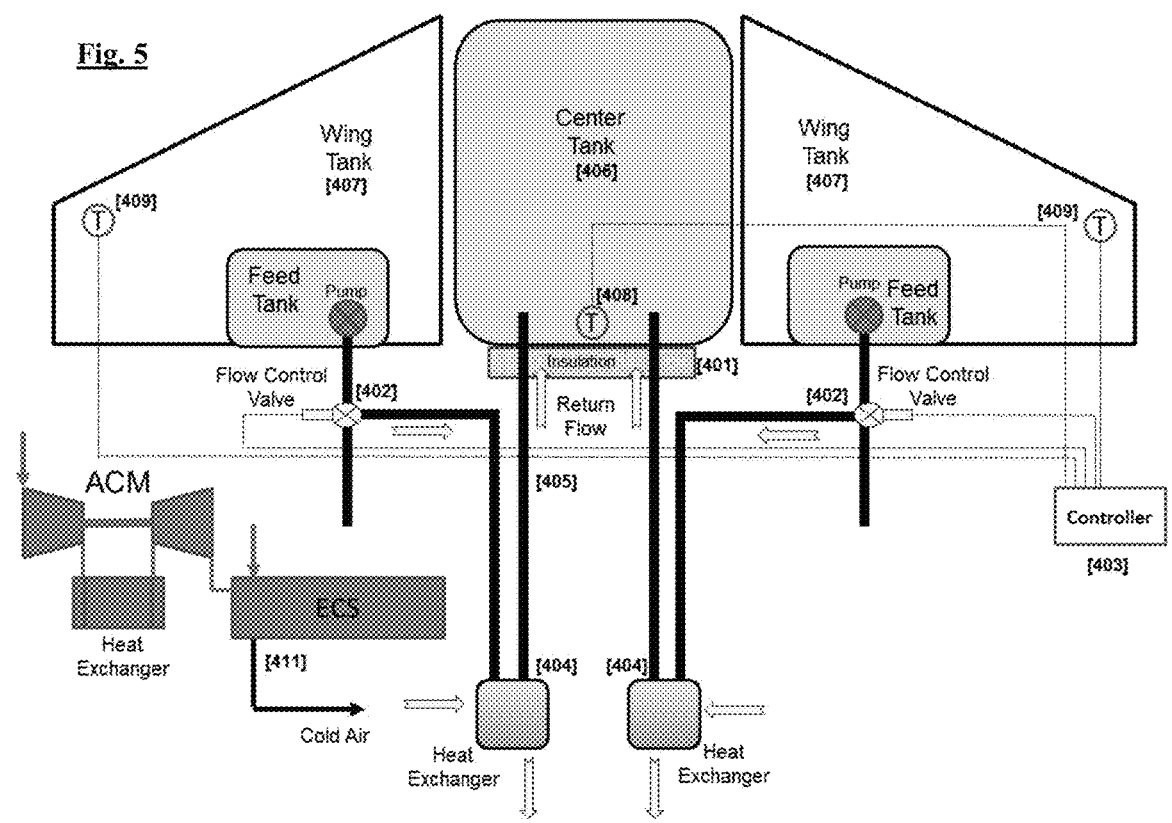
FIG. 5 is a schematic diagram showing a system for controlling aircraft fuel tank flammability using a fuel distribution architecture and fuel cooling approach, configured with a cooling loop heat exchanger supplied with cooling flow from cold air from the aircraft ECS conditioned air output, according to a fourth embodiment of the invention.
Figure 6:
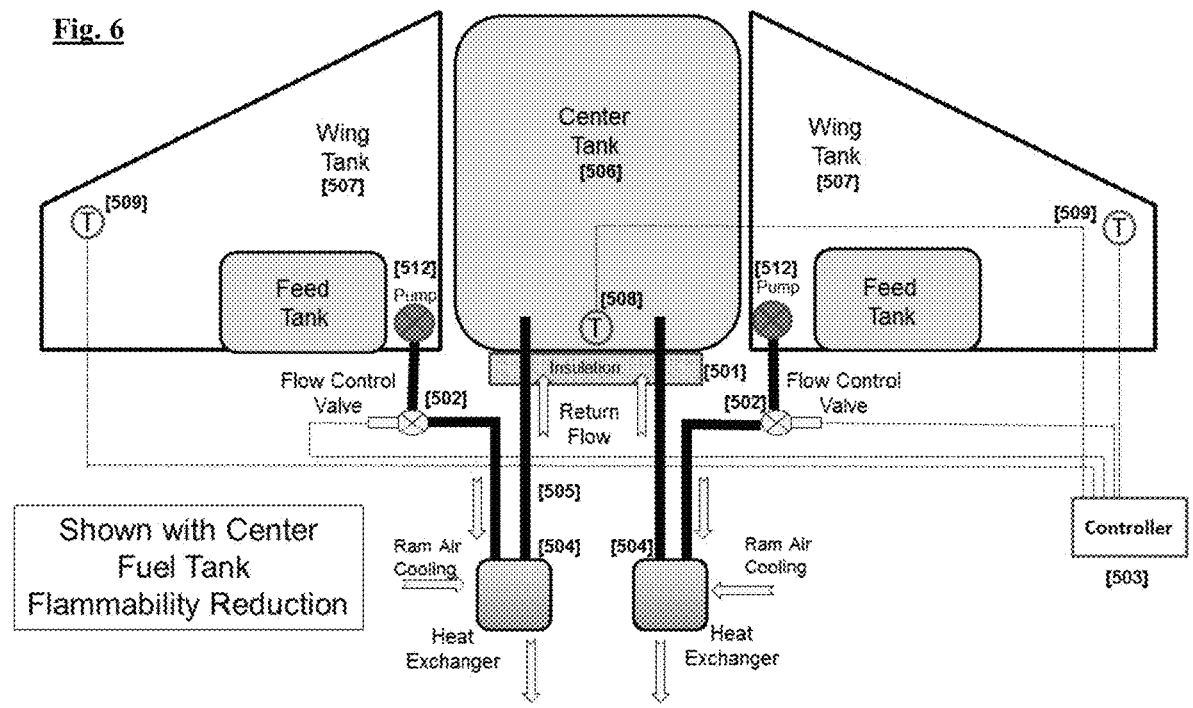
FIG. 6 is a schematic diagram showing a system for controlling aircraft fuel tank flammability using a fuel distribution architecture and fuel cooling approach, configured with a cooling loop heat exchanger supplied with cooling flow using a closed loop configuration and dedicated recirculation pumps, according to a fifth embodiment of the invention.

A fourth embodiment of the present invention will now be described with reference to FIG. 5, and comprises an embodiment of the invention where fuel in an aircraft fuel tank is cooled to reduce its temperature below the flammability limit for the fuel being used, using cold air from the aircraft Environmental Control System (ECS) 411. The ECS is arranged to condition air that is circulated to the passenger area of the aircraft and therefore air within it is typically significantly cooler than the target temperature of the fuel tanks. Again, features of FIG. 5 corresponding to those of FIG. 2 are indicated by the same reference numerals increased by 300. Heat flow from high temperature bays which are adjacent to the fuel tank is minimized by use of insulation 401, in order to minimize the fuel cooling requirements of the present invention. Fuel flow is diverted from a tee in the fuel engine feed flow supply via a flow control valve 402, which allows the diverted fuel flow to be on or off. Control of the diverter valve is by means of a system controller 403. When valve 402 is open, fuel flows to both the engine and the cooling loop of the present invention. When valve 402 is closed, fuel continues to flow to the engine, whereas flow to the cooling loop is stopped. When the cooling loop is flowing fuel, it is routed to the air cooled heat exchanger 404. Cooling air flow for the heat exchanger 404 is provided by means of cold air flow from the aircraft ECS 411, and discharged to the outside of the aircraft by means of an outlet duct. As the fuel flows through the heat exchanger, its temperature is reduced and flows to the 'target tank' 406, by means of the return flow path 405 to reduce the temperature of the fuel in this tank. In the present embodiment, the 'target tank' is the center tank located in the aircraft fuselage. Fuel is later returned to the main/wing tanks 407 by means of the standard aircraft transfer system as in normal transfer sequencing. When the temperature of the fuel in the target/center tank reduces below or equal to the required and prescribed temperature, as measured by the in-tank temperature sensor 408, the controller 403 commands the flow control valve 402 closed. The temperature of the main/wing tanks is also measured by means of the in-tank temperature sensors 409, and this temperature measurement information is conveyed to the controller 403 for temperature comparison purposes. It will be appreciated by one who is skilled in the art that the 403 controller is programmed to control the cooling flow such that it reduces the temperature in the target tank to a level below the flammability zone for the fuel used at the required aircraft altitude within the required period of time. The dwell time of system operation is such that the fuel temperature is within the flammability zone for one or more periods of time which are limited to be compliant with the allowable levels in the regulations. As the regulations may prescribe that the target/center tank 406 flammability exposure is equivalent to that of the main/wing tanks 407, the system controller may analyze and compare these two tank temperatures to minimize the time whereas the cooling loop is commanded open. The level of insulation 401 efficiency should also be optimized to reduce heat flow into the target tank 406, while minimizing its thickness and bay intrusion A fifth embodiment of the present invention will now be described with reference to FIG. 6, and comprises an embodiment of the invention where fuel in an aircraft fuel tank is cooled to reduce its temperature below the flammability limit for the fuel being used, using a dedicated separate additional fuel cooling flow loop. Again, features of FIG. 6 corresponding to those of FIG. 2 are indicated by the same reference numerals increased by 400. Heat flow from high temperature bays which are adjacent to the fuel tank is minimized by use of insulation 501, in order to minimize the fuel cooling requirements of the present invention. Fuel flow is pumped from the main/wing tanks by a dedicated pump 512 via a flow control valve 502, which allows the fuel flow to be on or off. Control of the flow control valve is by means of a system controller 503. When valve 502 is open and the pump 512 is energized, fuel flows to the cooling loop of the present invention. When valve 502 is closed and the pump 512 is de-energized, flow to the cooling loop is stopped. When the cooling loop is flowing fuel, it is routed to the air cooled heat exchanger 504. Cooling air flow for the 504 heat exchanger is provided by means of a ram inlet duct or NACA scoop, and discharged to the outside of the aircraft by means of an outlet duct. As the fuel flows through the heat exchanger, its temperature is reduced and flows to the 'target tank' 506, by means of the return flow path 505 to reduce the temperature of the fuel in this tank. In the present embodiment, the 'target tank' is the center tank located in the aircraft fuselage, although described for the present embodiment it is compatible with other target tank solutions and is therefore not limited to the target tank being the center tank. Fuel is later returned to the main/wing tanks 507 by means of the standard aircraft transfer system as in normal transfer sequencing. When the temperature of the fuel in the target/center tank reduces below or equal to the required and prescribed temperature, as measured by the in-tank temperature sensor 508, the controller 503 commands the flow control valve 502 closed, and the pump 512 de-energized. The temperature of the main/wing tanks is also measured by means of the in-tank temperature sensors 509, and this temperature measurement information is conveyed to the controller 503 for temperature comparison purposes. It will be appreciated by one who is skilled in the art that the 503 controller is programmed to control the cooling flow to such that it reduces the temperature in the target tank to a level below the flammability zone for the fuel used at the required aircraft altitude within the required period of time. The dwell time of system operation is such that the fuel temperature is within the flammability zone for one or more periods of time which are limited to be compliant with the allowable levels in the regulations. As the regulations may prescribe that the target/center tank 506 flammability exposure is equivalent to that of the main/wing tanks 507, the system controller may analyze and compare these two tank temperatures to minimize the time whereas the cooling loop is commanded open. The level of insulation 501 efficiency should also be optimized to reduce heat flow into the target tank 506, while minimizing its thickness and bay intrusion.

A sixth embodiment of the present invention will now be described with reference to FIG. 7, and comprises an embodiment of the invention where fuel in an aircraft fuel tank is cooled to reduce its temperature below the flammability limit for the fuel being used, for a fuel tank configuration where the feed tank is located within the aircraft fuselage plan-form. Again, features of FIG. 7 corresponding to those of FIG. 2 are indicated by the same reference numerals increased by 500. Heat flow from high temperature bays which may be (but not limited to) adjacent to the fuel tank may be (but not limited to) minimized by use of insulation 601, in order to minimize the fuel cooling requirements of the present invention. Fuel flow is diverted from a tee in the fuel engine feed flow supply via a flow control valve 602, which allows the diverted fuel flow to be on or off. Control of the diverter valve is by means of a system controller 603. When valve 602 is commanded open, fuel flows to both the engine and the cooling loop of the present invention. When valve 602 is commanded closed, fuel continues to flow to the engine, whereas flow to the cooling loop is stopped. When the cooling loop is flowing fuel, it is routed to the air cooled heat exchanger 604. Cooling air flow for the 604 heat exchanger is provided by means of a ram inlet duct or NACA scoop, and discharged to the outside of the aircraft by means of an outlet duct. As the fuel flows through the heat exchanger, its temperature is reduced and flows to the 'target tank' (this being the fuel feed tank) 606, by means of the return flow path 605 to reduce the temperature of the fuel in this tank. In the present embodiment, the 'target tank' is the center tank (this being the fuel feed tank) located in the aircraft fuselage. When the temperature of the fuel in the target/feed tank reduces below or equal to the required and prescribed temperature, as measured by the in-tank temperature sensor 608, the controller 603 commands the flow control valve 602 closed. It will be appreciated by one who is skilled in the art that the 603 controller is programmed to control the cooling flow to such that it reduces the temperature in the target tank to a level below the flammability zone for the fuel used at the required aircraft altitude within the required period of time. The dwell time of system operation is such that it is within the flammability zone and is limited to be compliant with the allowable levels in the regulations. As the regulations may prescribe that the target/feed tank 606 flammability exposure is equivalent to that of the main/wing tanks 607, the system controller may analyze and compare these two tank temperatures to minimize the time whereas the cooling loop is commanded open. The level of insulation 601 efficiency should also be optimized to reduce heat flow into the target tank 606, while minimizing its thickness and bay intrusion. The cooling loop of the present invention may also be by use of dedicated pumps as described in the fifth embodiment, except that the pumps may be located in the center feed tank. Further, it will be appreciated by one who is skilled in the art, that the center feed tank may be totally partitioned to provide individual and separate fuel containment for the separate supply to each of the engines.

In a seventh embodiment of the present invention, the solution of the first embodiment (or any of the second to sixth embodiments) as described herein is combined with a procedure which includes pre-cooling of the uploaded fuel to below a predetermined temperature, corresponding to prescribed flammability levels. This may serve to reduce the size of the cooling loop heat sink capacity. This may also reduce cooling loop complexity and control complexity, in addition to reducing the size of the heat exchangers, pumps and flow rates in the cooling loop. For example, this may be achieved by a fuel cooling system or module forming part of the fuel supply system arranged to supply fuel to the aircraft at the airport, typically at the airport gate.

Referring to FIG. 9, in further embodiments of the present invention, the solution of the first embodiment as described herein as it relates to fuselage mounted/center tanks is combined with a method of maintaining the ullage pressure of wing tanks, in particular (but not limited to) if they are of a type having lower cooling properties, to be higher than the ambient pressure around the aircraft while at altitude. It will be appreciated by one who is skilled in the art that increasing the pressure of the tank ullage in such wing tanks with lower cooling properties relative to local ambient will reduce the propensity of the tank to enter into the flammability zone as prescribed by typical regulations for fuel tank flammability exposure. Pressurizing the ullage relative to local ambient, combined with the first embodiment for fuselage/center tanks (or the second to sixth embodiments) may reduce the size and heat sink capacity requirements of these embodiments in combination, while maintaining the fleet-wide flammability exposure of the fuel tanks within limits prescribed by the regulations. In this case the controller 803 inputs may be arranged to receive signals from a pressure sensor 844 and a fuel level sensor 846 in each of the wing tank and the centre tank 806, and the target temperature of the fuel and the operative times of the cooling circuit are determined by the controller on the basis of those signals as well as the other inputs it receives. The system further comprises a pressure control system comprising a pump 848 having an inlet connected via a flow control valve 850 to a source 851 of air, which may be external to the aircraft. A vent valve 854 is also provided in an [otherwise] conventional fuel tank vent outlet 856 from the tank. The controller 803 is further arranged to control the pump 848 and the valves 850, 854 so as to control the ullage pressure in the tank 806. This system can be provided for any of the fuel storage tanks on the aircraft, and in this embodiment is provided for each of the wing tanks and the centre tank. The controller 803 is therefore able to monitor and control the ullage pressure in each of the tanks. The pressure in each of the tanks can therefore be monitored and controlled by the controller 803, together with the fuel cooling as described above, to optimise the fuel flammability levels.

In a modification to the pumped air supply of FIG. 9, in an alternative embodiment, the control valve 850 is connected to an alternative supply of pressurized air, for example the aircraft cabin air supply pressure. This removes the need for a dedicated pump for controlling the fuel tank ullage pressure.

In further embodiments of the present invention, the solution of the first embodiment (or one of the other embodiments) as described herein is combined with a method of maintaining the target tank (whether that is the centre tank or the wing tanks) ullage pressure to be higher than the ambient pressure around the aircraft while at altitude. It will be appreciated by one who is skilled in the art that increasing the pressure of the tank ullage relative to local ambient will reduce the propensity of the tank to enter into the flammability zone as prescribed by typical regulations for fuel tank flammability exposure. Pressurizing the ullage relative to local ambient, combined with any one of the first to sixth embodiments may reduce the size and heat sink capacity requirements of these embodiments in combination, while maintaining the fleet-wide flammability exposure of the fuel tanks within limits prescribed by the regulations. The combination of increased ullage pressure and fuel cooling would therefore normally result in the fuel cooling system normally only operating at low fuel states and therefore minimize the heat load in the system and therefore system size.

Referring to FIG. 8, in further embodiments of the present invention, the solution of each of the first to sixth embodiments as described herein is modified in that the fuel cooling of fuel in the fuselage and/or center tanks is achieved by a liquid cooling loop which is separate from the fuel supply system and uses a fluid medium other than fuel. Such solutions could include, but not limited to, such liquids as coolant, refrigerant, hydraulic oil, direct air ventilation or water. The cooling loop for such solutions typically includes a fluid storage tank or reservoir 730, a pump 720, and a heat exchanger 704 which may be as described above for other embodiments and is arranged to cool the fluid. It may include tank mounted heat exchangers, or coiled tubes 732 at the tank floor, whereby the fluid is arranged to cool the fuel in the fuel tank. The control of the cooling system in these embodiments is essentially the same as in the embodiments described above, with the cooling circuit being turned on or off (by means of the system controller) depending on when fuel cooling is required.

Figure 10:
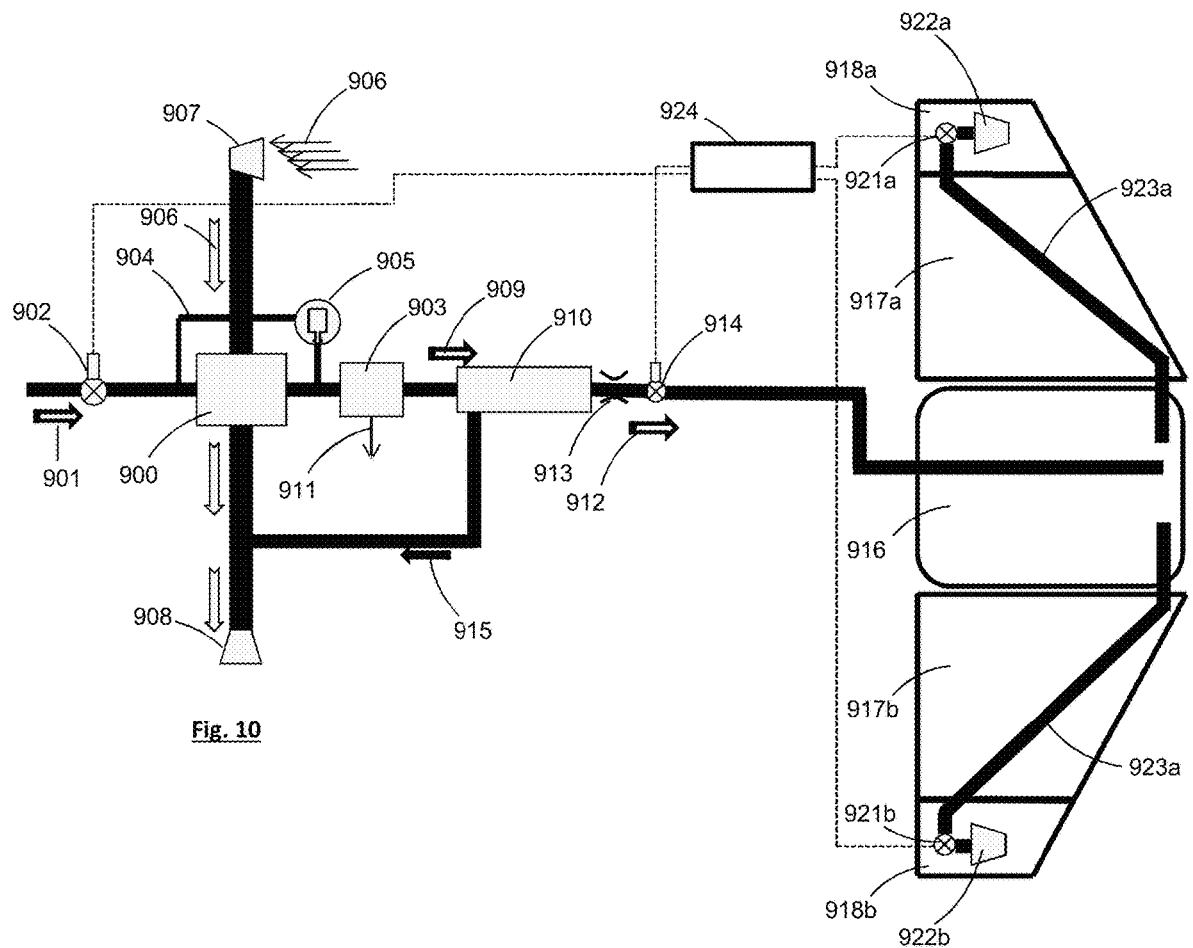
FIG. 10 is a schematic diagram showing a hybrid pressurisation and inerting system for controlling the flammability of a central fuel tank of an aircraft, according to a further embodiment of the invention.

Referring to FIG. 10, a hybrid system is shown which controls the conditions in the central tank 916 so that the fuel is kept in a safe non-flammable condition. In this embodiment of the invention the hybrid system combines an inerting system with a pressure control system.

The inerting system comprises a heat exchanger 900 which has an inlet connected to a pipe which supplies hot bleed air 901 from the engine, through an isolation control valve 902. The corresponding outlet of the heat exchanger 900 is connected to a pipe which supplies cooled engine bleed air to a coalescing filter 903. A heat exchanger by-pass pipe 904 is connected between the inlet and outlet of the heat exchanger and a temperature control valve 905 is located in the by-pass pipe. The heat exchanger 900 is also connected to a pipe which receives external cooling air 906 from a ram air inlet 907 and the corresponding outlet from the heat exchanger is connected to a pipe which supplies the exhaust cooling air to an overboard outlet 908. The outlet from the coalescing filter 903 is connected to a pipe which supplies conditioned air 909 to an air separation module (ASM) 910. The coalescing filter 903 also has a water drain outlet 911. The ASM has an outlet connected to a pipe which supplies nitrogen enriched air 912 into the central fuel tank 916. The pipe supplying the nitrogen enriched air 912 to the central fuel tank 916 comprises a flow restrictor 913 and a flow control valve 914. The ASM 910 also comprises an exhaust outlet which is connected to a pipe which directs oxygen enriched air 915 to the overboard outlet 908. The wing tanks 917a and 917b, in this embodiment of the invention, are not connected to the nitrogen enriched air 912 supply from the ASM 910, though in a modification to this embodiment they are so connected.

The pressure control system comprises two vent pipes 923a and 923b each connecting the central fuel tank 916 to a respective vent compartment 918a, 918b, each of which is located near one of the wing tips of the aircraft. Two pressure control valves (PCVs) 921a and 921b, one in each vent compartment 918a and 918b, are arranged to control the flow of gas through the vent pipes. The vent compartments 918 are vented to atmosphere through vents 922a and 922b. Each PCV 921 has an outlet which opens into the vent compartment 918. The inlets of the PCVs 921 are each connected to the ullage region of the central fuel tank 916 by the vent pipes 923a and 923b.

A controller 924 is in communication with: the PCVs 921 located in the vent compartments 918; the flow control valve 914 which controls the supply of nitrogen enriched air 912 to the central fuel tank 916; and the isolation control valve 902 which controls the supply of hot bleed air from the engines. By controlling the bleed air isolation valve 902 the system can allow the flow of hot bleed air 901 into the system. In some system the hot bleed air may be supplied from the engines at 40-60 psi which is sufficiently high to avoid the need for intermediate booster pumps The hot bleed air flows through the heat exchanger 900 where it is cooled by the ram air which is ducted through the heat exchanger 900. Some of the hot bleed air may bypass the heat exchanger via the bypass pipe 904 and temperature control valve 905 if the temperature control valve opens in response to a temperature drop. The hot bleed air is conditioned in the coalescing filter 903 where moisture is removed and expelled via outlet drain 911. The conditioned air is then passed through the ASM 910 which removes a high proportion of the oxygen from the air producing nitrogen enriched air (NEA) 912 at the outlet in connection with the centre tank. The ASM exhausts oxygen enriched air (OEA) 915 to the overboard outlet 908. The pressure of the NEA is further reduced before entering the central fuel tank by restrictor 913. Flow control valve 914 controls the supply of NEA to the central fuel tank.

In operation, beginning at take-off, the controller 924 holds the PCVs open so the central fuel tank is vented to atmosphere via the vent pipes 923 and the pressure in the fuel tank is at the 0 ft or 14.7 pounds per square inch absolute (psia.) level. In this embodiment the inerting and pressurising systems operate only on the central fuel tank. The wing tanks are naturally vented but may employ other flammability reduction systems. At take-off the central tank ullage region will be filled with NEA supplied by the inerting system. The controller 924 holds the PCVs 921 open until the aircraft reaches about 10,000 ft at which point the PCVs are closed maintaining the pressure in the central fuel tank 916 at the 10,000 ft (10.1 psia) level. Closing the PCVs as the aircraft continues to climb has the effect of pressurising the fuel tank. It sets the pressure level in the fuel tank at 10,000 ft. The valves remain closed until the aircraft descends back to 10,000 ft where the pressure in the tank will be equal to the external atmospheric pressure.

It will be appreciated that the system can detect the point at which the PCVs are to be closed in different ways. In this embodiment of the invention the system includes dual redundant pressure sensors arranged to measure the pressure inside the central fuel tank 916, and communicate with the controller 924 so that the controller can determine when the set pressure has been reached. The system may also receive altitude data, this may be from the aircraft's altitude sensor or from another pressure sensor which measures atmospheric pressure, and may control the PCVs based on the altitude data.

The inerting system will continue to supply NEA to the central fuel tank during the flight to compensate for any loss in tank pressure due to the fuel level dropping. When the aircraft is above 10,000 ft, if the inerting system introduces NEA into the ullage region which is above the 10.1 psia set pressure level the system can release this excess pressure through the PCVs but the valves will immediately close when the pressure level is reduced to the 10.1 psia set pressure level. The inerting system will continue to supply NEA into the central tank 916 to further reduce the purity of oxygen in the ullage gas down to the desired nitrogen percentage (6% for example) as the aircraft climbs to cruise altitude (40,000 ft for example) in order to provide a buffer so that any oxygen which enters the tank from the atmosphere during landing does not increase the purity above the 12% threshold.

When the aircraft descends back to the 10,000 ft altitude the PCVs 921 will open. The pressure in the fuel tank will be equal with the atmospheric pressure. As the aircraft continues to descend atmospheric pressure will rise and the pressure in the fuel tank will also rise by atmospheric air entering the tank through the vents 922 and the inerting system continues to supply NEA to the tank.

In prior art fuel tanks which are permanently vented to atmosphere the fuel tank pressure continues to drop as the aircraft climbs past the 10,000 ft level. The pressure excursion of the fuel tank is a measure of the change in the ullage gas pressure experienced during a flight. For example if an aircraft flies to 40,000 ft (2.7 psia.) the pressure excursion is 12 psi (14.7 psia.–2.7 psia.). As the aircraft climbs some ullage gas will be vented because of the reducing atmospheric pressure and when the aircraft starts to descend the vented ullage gas will need to be replaced either by atmospheric air or by pumping in more NEA. It is therefore advantageous to minimise the volume of gas which is emitted and replaced during a flight to avoid losing NEA and then having to replace it.

In commercial aircraft the target for an inerting system is to maintain the oxygen levels in the fuel tank at 12% or lower (normal atmospheric air level being around 21%) throughout the flight in order to keep fuel flammability sufficiently low. In prior art systems in order to keep the percentage of oxygen in the ullage gas below a safe level on landing, the purity of oxygen in the ullage gas is reduced to as low as 2% at altitude to provide a buffer in order to prevent oxygen which enters the tank from the atmosphere during descent raising the concentration above the 12% limit on landing.

In the system of FIG. 10 as an example the pressure excursion of the pressurised fuel tank is only 4.6 psi (14.7 psia.–10.1 psia.) because the tank is maintained at the 10,000 ft level as the aircraft climbs to altitude. Therefore much less NEA will be vented to the atmosphere as the aircraft continues to climb past 10,000 ft and during descent no air will be allowed into the tank from the atmosphere until the vents open at 10,000 ft. Because atmospheric air is not allowed into the tank above 10,000 ft, the purity of the nitrogen buffer can be reduced. In the present system the purity of oxygen in the tank can be reduced to a lesser extent at altitude. Therefore a pressurised tank will require a significantly reduced flow of NEA because much less NEA is lost to the atmosphere as the ullage gas escapes when the aircraft climbs in altitude. It will also reduce the demand on the inerting system because the percentage of oxygen in the tanks does not need to be reduced to the extent of an atmospheric vented tank.

It will be appreciated that because of the lower demands of the inerting system a smaller inerting system can be used which has fewer ASMs and requires significantly less bleed air. ASMs are expensive modules that require periodic replacement and therefore reducing their number is clearly advantageous.

Although the system set pressure level is taken as atmospheric pressure at 10,000 ft in this and other embodiments of the invention described below, the set pressure level may be another chosen pressure in between absolute pressure at ground level and absolute pressure at maximum altitude. The controller 924 may have an input arranged to receive altitude data which may contain a maximum altitude during the next flight, and may be arranged to select a set pressure level depending on the maximum intended altitude the aircraft will achieve during flight. Alternatively the set pressure level may be constant for all flights.

Figure 11:
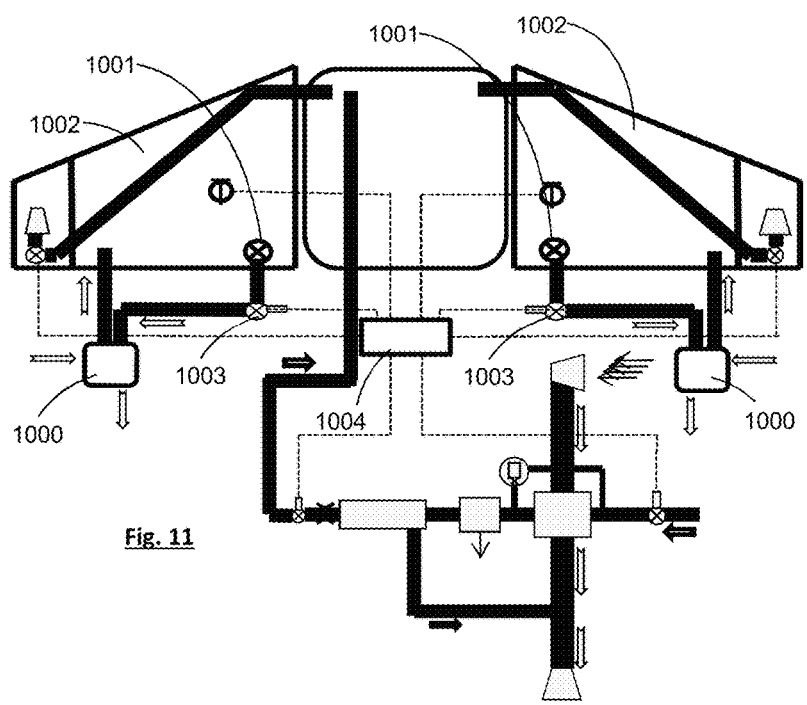
FIG. 11 is a schematic diagram showing the hybrid pressurisation and inerting system of FIG. 10 combined with a wing tank cooling system, according to a further embodiment of the invention.

An alternative hybrid pressurised inerting system is shown in FIG. 11. In this embodiment of the invention the inerting and pressurising systems are the same as that shown in the system of FIG. 10. In this system an additional cooling system is fitted to each wing tank 1002. The wing tank cooling systems each comprise a heat exchanger 1000 which receives fuel from a pump 1001 located in the wing fuel tank 1002. Fuel is pumped to the heat exchanger through a flow control valve 1003. The flow control valve is connected to the system controller 1004 which controls its operation. The heat exchanger 1000 has an outlet back into the wing fuel tank 1002. The heat exchanger may be cooled by RAM air or any other means as described in relation to other embodiments of the invention. The cooling systems circulate the fuel in the wing tanks through the heat exchangers 1000 and by controlling the flow with the flow control valves 1003 the temperature of the fuel in the wing tanks can be reduced to a controlled level. The cooling system of this embodiment may include any of the features of the cooling system of FIG. 2.

This hybrid system of FIG. 11 has application particularly in composite wing aircraft which have increased cooling demands on the wing fuel tanks because the composite materials have more of an insulating effect than aircraft with wings made of an aluminium construction. Cooling the fuel in this way avoids the need to inert the wing tanks and only a small inerting system is required for the central tank due to the fuel tank pressurisation system.

Figure 12:
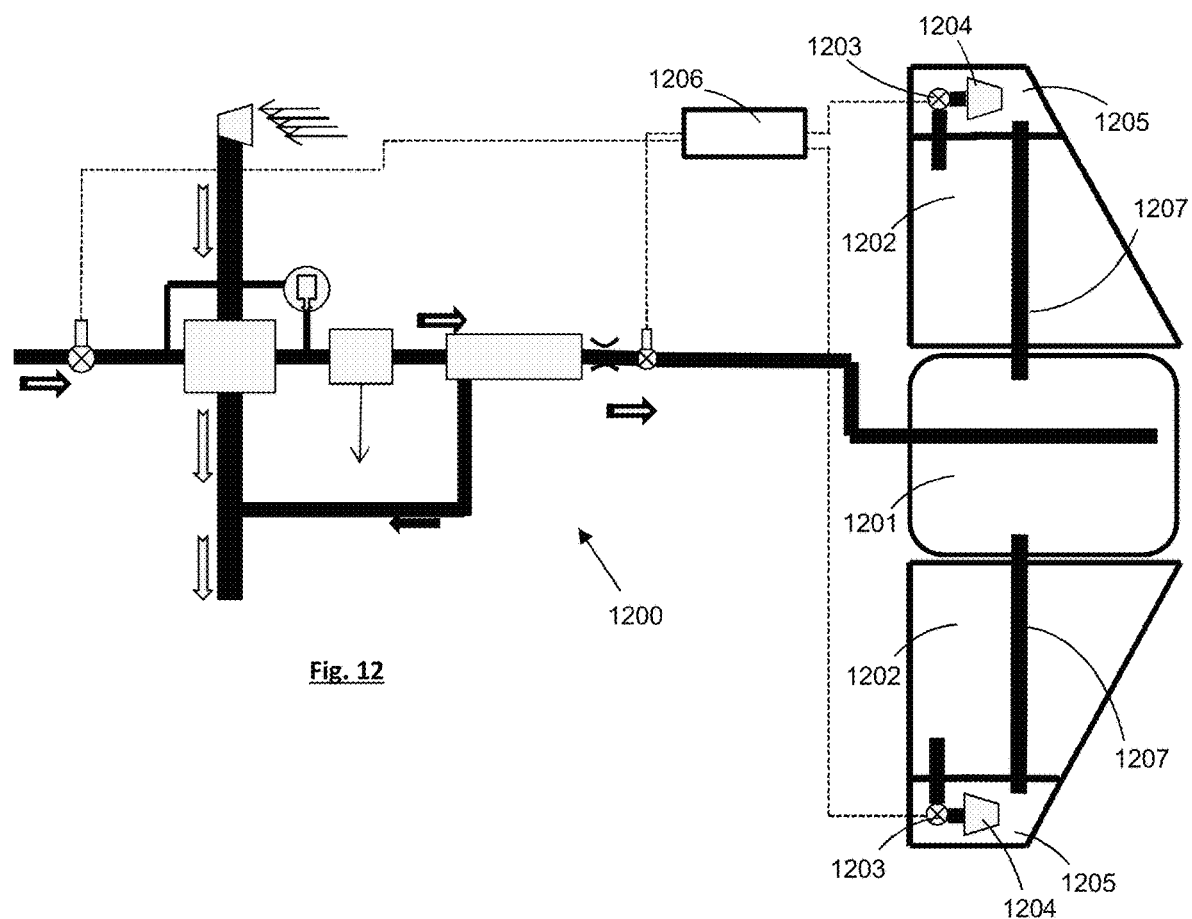
FIG. 12 is a schematic diagram showing a hybrid flammability control system which combines a pressurisation system for the wing tanks with an inerting system for the central fuel tank of an aircraft, according to a further embodiment of the invention.

Referring to FIG. 12, a hybrid flammability reduction system is shown according to a further embodiment of the invention. In this hybrid system an inerting system 1200 supplies NEA to the central fuel tank 1201. The ullage region of the central fuel tank is connected to the vent compartments 1205 through vents pipes 1207. A pressure control system is fitted to the wing tanks 1202. The pressure control system comprises two PCVs 1203, one for each wing tank. Each PCV is located in a duct which connects the ullage region of the wing tank to an atmospheric vent 1204. The PCV is arranged to control the flow of air in the duct between the ullage region and the atmosphere. The vents 1204 are located in vent compartments 1205 in each wing tip. The vent compartments 1205 are open to the atmosphere. The PCVs are in communication with a controller 1206.

In operation the pressurising system in the system of FIG. 12 operates in the same manner as the pressurising system in the systems shown in FIGS. 10 and 11. However, in this embodiment of the invention the pressurising system has a different purpose. The PCVs are set to close when the aircraft reaches a preset altitude of, for example, 10,000 ft which pressurises relative to ambient the wing tanks as the aircraft continues to climb. Considering FIG. 13, by closing the PCVs at 10,000 ft it avoids the pressure of the fuel reducing and passing into the flammability envelop. Instead the tank is maintained at the example 10,000 ft pressure level until the aircraft descends back to 10,000 ft when the PCVs 1203 are opened, as represented by line 1300. Alternatively, it will be appreciated that the set threshold pressure level may be stepped to reduce the set threshold pressure as the temperature of the fuel reduces, as represented by line 1301. For example, the PCVs 1203 may be controlled by the controller 1206 to reduce the set pressure level to atmospheric pressure at, for example, 20,000 ft when the temperature of the fuel has dropped below approximately 60° F. In a modification to this embodiment fuel cooling circuits may be fitted to the wing tanks. The cooling circuit may include any of the features of the cooling system of FIG. 2 or FIG. 11.

The centre tank 1201 in the system of FIG. 12 employs a standard vented inerting system. The pressuring system on the wing tanks avoids the need for an inerting system for the wing tanks and therefore reduces the requirements of the inerting system. It will be appreciated that to further reduce the requirements of the inerting system in the system of FIG. 12 a pressurising system may also be fitted to the central tank as in the systems of FIGS. 10 and 11.

Referring to FIG. 14, a hybrid system in accordance with a further embodiment of the invention is shown. This hybrid system combines inerting and pressurisation of the central tank with pressurisation of the wing tanks. In this system the central tank 1400 is connected to a supply of NEA 1402 from an inerting system 1401. The ullage region of the central tank 1400 is connected to the ullage region of the wing tanks 1404 via ducts 1405. Each duct 1405 is also connected to an atmospheric vent 1406 located in a vent compartment. A PCV 1407 is located in each duct 1405 which controls the flow of gas between the atmosphere and the central 1400 and wing 1404 fuel tanks.

Figure 13:
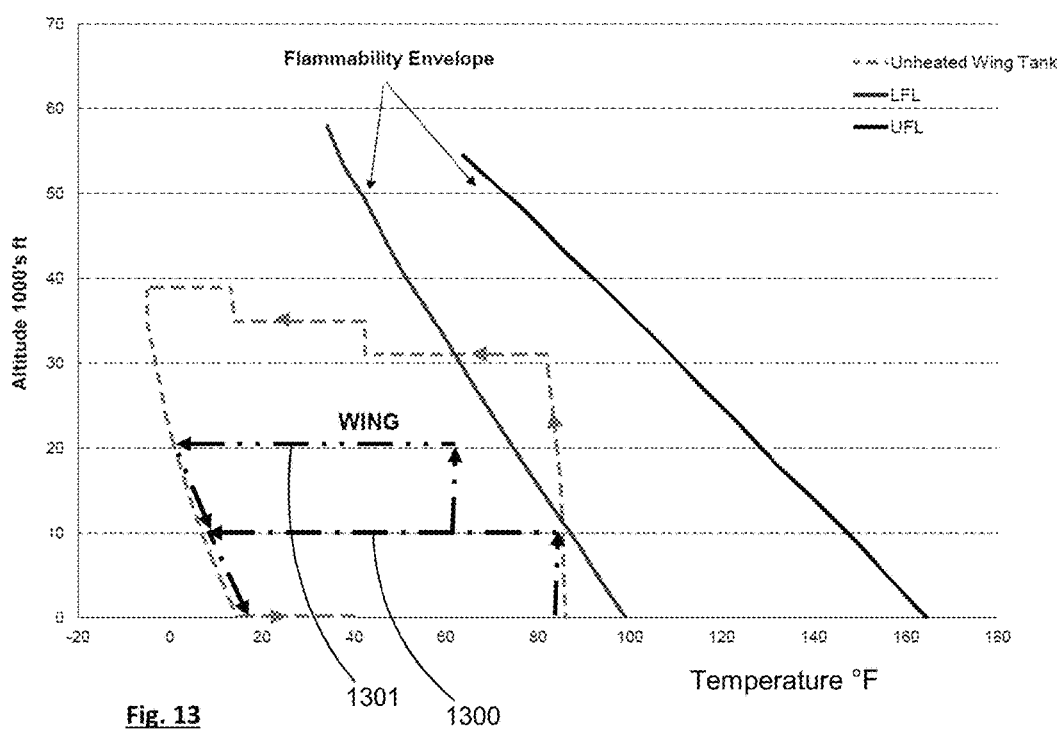
FIG. 13 is a graph showing typical flammability exposure of a conventional metal wing tank compared to the pressurised wing tank of the system shown in FIG. 12.

In operation the pressurising system in the system of FIG. 14 operates in the same manner as the pressurising systems shown in FIGS. 10 and 11, but in this system pressurisation acts on both the central fuel tank 1400 and the wing tanks 1404 to reduce their pressure excursion. The pressure in the central wing tank 1400 reduces the size of the inerting system 1401. The pressure in the wing tanks 1404 reduces the flammability exposure as shown in FIG. 13.

Referring to FIG. 15, an alternative hybrid system according to a further embodiment of the present invention is shown. In this hybrid system wing tank 1501 fuel cooling is combined with central tank 1500 inerting. The fuel cooling system 1503 is the same as the system referred to in FIG. 11 and the inerting system 1502 is the same as that referred to in FIG. 10 with the exception that both the wing tanks and the central fuel tank are vented to the atmosphere (the vents are not represented in FIG. 15). The wing tank cooling system 1503 avoids the need for the wing tanks 1501 to be inerted reducing the requirements of the inerting system 1502. It will be appreciated that the system may be further improved by adding a pressuriation system to the fuel tanks in accordance with the other hybrid pressurisation systems disclosed herein.

The invention claimed is:

1. A flammability reduction system for an aircraft comprising:
   an inerting gas supply arranged to supply inerting gas to a fuel tank;
   a vent arranged to allow gas flow between an ullage region of the fuel tank and atmosphere; and
   a pressure control system arranged to maintain an absolute pressure in the ullage region at a constant pressure value when the aircraft is above a preset ascent altitude until the aircraft descends back to a preset descent altitude, wherein the pressure control system comprises a valve arranged to control the gas flow through the vent, and wherein the pressure control system is arranged to hold the valve open from take-off until the aircraft reaches the preset ascent altitude, to close the valve when during ascent the aircraft reaches the preset ascent altitude and continues to climb, and to open the valve when during descent the aircraft reaches the preset descent altitude.

2. The system of claim 1 wherein the pressure control system is arranged to allow atmospheric air from the vent into the ullage region when the atmospheric air is above the constant pressure value.

3. The system of claim 1 wherein the constant pressure value is set to limit excursion pressure of the fuel tank between the aircraft taking off and landing.

4. The system of claim 1 wherein the constant pressure value is in the range of 14.7 to 5 psia.

5. The system of claim 1 wherein the constant pressure value is approximately equivalent to 10 psia.

6. The system of claim 1 wherein the pressure control system is arranged to prevent the pressure in the ullage region exceeding the constant pressure value.

7. The system of claim 1 wherein the pressure control system comprises a controller arranged to control operation of the valve.

8. The system of claim 7 wherein the controller is arranged to receive aircraft altitude data relating to a flight path, and to set the constant pressure value according to the aircraft altitude data.

9. The system of claim 1 wherein the vent is arranged to be connected to a further fuel tank of the aircraft whereby the pressure control system is also arranged to control the pressure in the further fuel tank.

10. The system of claim 9 wherein the further fuel tank is connected to a cooling circuit arranged to cool fuel in the further fuel tank.

11. A flammability reduction system for an aircraft comprising:
a vent arranged to allow gas flow between an ullage region of a fuel tank and atmosphere; and
a pressure control system arranged to maintain an absolute pressure in the ullage region at a constant pressure value when the aircraft is above a preset ascent altitude until the aircraft descends back to a preset descent altitude, wherein the pressure control system comprises a valve arranged to control the gas flow through the vent, and wherein the pressure control system is arranged to hold the valve open from take-off until the aircraft reaches the preset ascent altitude, to close the valve when during ascent the aircraft reaches the preset ascent altitude and continues to climb, and to open the valve when during descent the aircraft reaches the preset descent altitude.

12. The system of claim 11 further comprising a cooling circuit arranged to cool fuel in the fuel tank.

13. The system of claim 12, wherein the fuel tank forms part of a fuel storage system and the cooling circuit is arranged to carry the fuel from the storage system through a heat exchanger and back to the storage system, and a pump is arranged to pump the fuel though the cooling circuit.

14. The system of claim 13 further comprising a valve arranged to control a fuel flow through the cooling circuit.

15. The system of claim 13 further comprising an engine fuel feed duct arranged to carry fuel from the storage system for feeding to an engine of the aircraft; and a control valve connected to the engine fuel feed duct thereby dividing the engine fuel feed duct into an upstream part and a downstream part; and arranged to divert fuel from the engine fuel feed duct towards the heat exchanger whereby the upstream part of the engine fuel feed duct forms a part of the cooling circuit.

16. The system of claim 13 wherein the heat exchanger has an inlet arranged to receive air from outside the aircraft to cool the fuel, and an outlet arranged to return the air to the atmosphere after it has passed through the heat exchanger.

17. The system of claim 12, wherein the fuel tank forms part of a fuel storage system and the cooling circuit comprising a cooling medium, a heat exchanger arranged to cool the cooling medium, and a pump arranged to pump the cooling medium through the cooling circuit thereby to cool the fuel.

18. The system of claim 1, wherein the pressure control system is arranged to receive altitude data from an altitude sensor of the aircraft which is used to determine when the preset ascent and descent altitudes have been reached.

19. The system of claim 11, wherein the pressure control system is arranged to receive altitude data from an altitude sensor of the aircraft which is used to determine when the present ascent and descent altitudes have been reached.

20. A flammability reduction system for an aircraft comprising:
an inerting gas supply arranged to supply inerting gas to a fuel tank;
a vent arranged to allow gas flow between an ullage region of the fuel tank and atmosphere; and
a pressure control system arranged to maintain an absolute pressure in the ullage region at a constant pressure value when the aircraft is above a preset ascent altitude until the aircraft descends back to a preset descent altitude, wherein the pressure control system comprises a valve arranged to control the gas flow through the vent, and wherein the pressure control system is arranged to hold the valve open from take-off until the aircraft reaches the preset ascent altitude, to close the valve when during ascent the aircraft reaches the preset ascent altitude and continues to climb, and to open the valve when during descent the aircraft reaches the preset descent altitude.

21. A flammability reduction system for an aircraft comprising:
a vent arranged to allow gas flow between an ullage region of a fuel tank and atmosphere; and
a pressure control system arranged to maintain an absolute pressure in the ullage region at a constant pressure value when the aircraft is above a preset ascent altitude until the aircraft descends back to a preset descent altitude, wherein the pressure control system comprises at least one valve arranged to control the gas flow through the vent, and wherein the pressure control system is arranged to hold the valve open from take-off until the aircraft reaches the preset ascent altitude, to close the valve when during ascent the aircraft reaches the preset ascent altitude atmospheric pressure and continues to climb, and to open the valve when during descent the aircraft reaches the preset descent altitude.

* * * * *